US009582157B1

(12) United States Patent
Chatterjee et al.

(10) Patent No.: US 9,582,157 B1
(45) Date of Patent: Feb. 28, 2017

(54) USER INTERFACE AND PROGRAM GUIDE FOR A MULTI-PROGRAM VIDEO VIEWING APPARATUS

(71) Applicant: i4Vu, Inc., Los Altos, CA (US)

(72) Inventors: Chanchal Chatterjee, Saratoga, CA (US); Robert Owen Eifrig, San Diego, CA (US)

(73) Assignee: I4VU1, Inc., Los Altos, CA (US)

( * ) Notice: Subject to any disclaimer, the term of this patent is extended or adjusted under 35 U.S.C. 154(b) by 535 days.

(21) Appl. No.: 13/958,442

(22) Filed: Aug. 2, 2013

Related U.S. Application Data

(60) Provisional application No. 61/679,611, filed on Aug. 3, 2012, provisional application No. 61/679,639, filed on Aug. 3, 2012.

(51) Int. Cl.
*G06F 3/00* (2006.01)
*G06F 3/0484* (2013.01)

(52) U.S. Cl.
CPC .................................. *G06F 3/0484* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,119,849 B2 * | 10/2006 | Yui | ............................ | G06F 3/14 345/660 |
| 7,757,252 B1 * | 7/2010 | Agasse | .............. | H04N 5/44543 715/700 |
| 8,401,566 B2 * | 3/2013 | Lee | ........................ | H04H 20/426 455/456.1 |
| 8,752,094 B2 * | 6/2014 | Kunkel | .............. | H04N 5/44543 725/37 |
| 2003/0117427 A1 * | 6/2003 | Haughawout | ...... | G01C 21/3682 715/710 |
| 2005/0071782 A1 * | 3/2005 | Barrett | ...................... | H04N 5/45 715/838 |
| 2005/0273838 A1 * | 12/2005 | Witheiler | ........... | H04N 5/44591 725/126 |
| 2006/0037045 A1 * | 2/2006 | Hsieh | .................. | H04N 5/44591 725/43 |
| 2007/0236611 A1 * | 10/2007 | Lin | ..................... | H04N 5/44543 348/731 |
| 2007/0277214 A1 * | 11/2007 | Kim | .................... | H04N 5/44591 725/131 |
| 2008/0307458 A1 * | 12/2008 | Kim | .................... | H04N 21/4316 725/38 |
| 2009/0132921 A1 * | 5/2009 | Hwangbo | ............. | G06F 3/0482 715/716 |
| 2009/0245393 A1 * | 10/2009 | Stein | ................ | H04N 21/23424 375/240.28 |
| 2010/0262712 A1 * | 10/2010 | Kim | ............... | H04N 21/234327 709/231 |

(Continued)

*Primary Examiner* — Hien Duong
(74) *Attorney, Agent, or Firm* — Lathrop & Gage LLP

(57) ABSTRACT

A user interface for display and navigation of multiple video programs displays a graphical user interface including a plurality of available video programs. A user is allowed to generate a custom list of video programs by selecting at least one video program from the plurality of video programs. The videos programs from the custom list are simultaneously displayed while displaying the graphical user interface to the user.

24 Claims, 32 Drawing Sheets

(56) References Cited

U.S. PATENT DOCUMENTS

| | | | |
|---|---|---|---|
| 2011/0016415 A1* | 1/2011 | Nam | H04N 21/41407 715/764 |
| 2011/0078743 A1* | 3/2011 | Kim | H04N 5/44543 725/56 |
| 2011/0119611 A1* | 5/2011 | Ahn | G06F 3/0346 715/769 |
| 2011/0157046 A1* | 6/2011 | Lee | G04G 21/08 345/173 |
| 2011/0175867 A1* | 7/2011 | Satake | H04N 5/44591 345/204 |
| 2011/0209177 A1* | 8/2011 | Sela | H04N 7/17318 725/39 |
| 2011/0231878 A1* | 9/2011 | Hunter | H04N 5/44543 725/48 |
| 2011/0239253 A1* | 9/2011 | West | H04N 21/234363 725/46 |
| 2011/0283232 A1* | 11/2011 | Jordan | H04N 5/44543 715/810 |
| 2012/0054797 A1* | 3/2012 | Skog | H04N 21/4314 725/41 |
| 2012/0057511 A1* | 3/2012 | Sivakumar | H04W 28/06 370/310 |
| 2012/0062473 A1* | 3/2012 | Xiao | H04N 5/76 345/173 |
| 2012/0072953 A1* | 3/2012 | James | G06F 3/04883 725/52 |
| 2012/0079429 A1* | 3/2012 | Stathacopoulos | G06F 17/30979 715/830 |
| 2012/0284753 A1* | 11/2012 | Roberts | H04N 21/41407 725/45 |
| 2012/0291071 A1* | 11/2012 | Seo | H04N 21/26283 725/41 |
| 2013/0104160 A1* | 4/2013 | Beeson | H04N 21/42209 725/28 |
| 2013/0155112 A1* | 6/2013 | Paretti | G09G 5/14 345/646 |
| 2013/0156098 A1* | 6/2013 | Schwartz | H04N 19/172 375/240.03 |
| 2013/0163952 A1* | 6/2013 | Ni | H04N 21/8106 386/230 |
| 2013/0238994 A1* | 9/2013 | Yurasits | G06F 3/0482 715/716 |
| 2013/0308919 A1* | 11/2013 | Shaw | H04N 21/2221 386/239 |
| 2014/0176479 A1* | 6/2014 | Wardenaar | G11B 27/34 345/173 |
| 2015/0032899 A1* | 1/2015 | Willars | H04L 65/4076 709/231 |

* cited by examiner

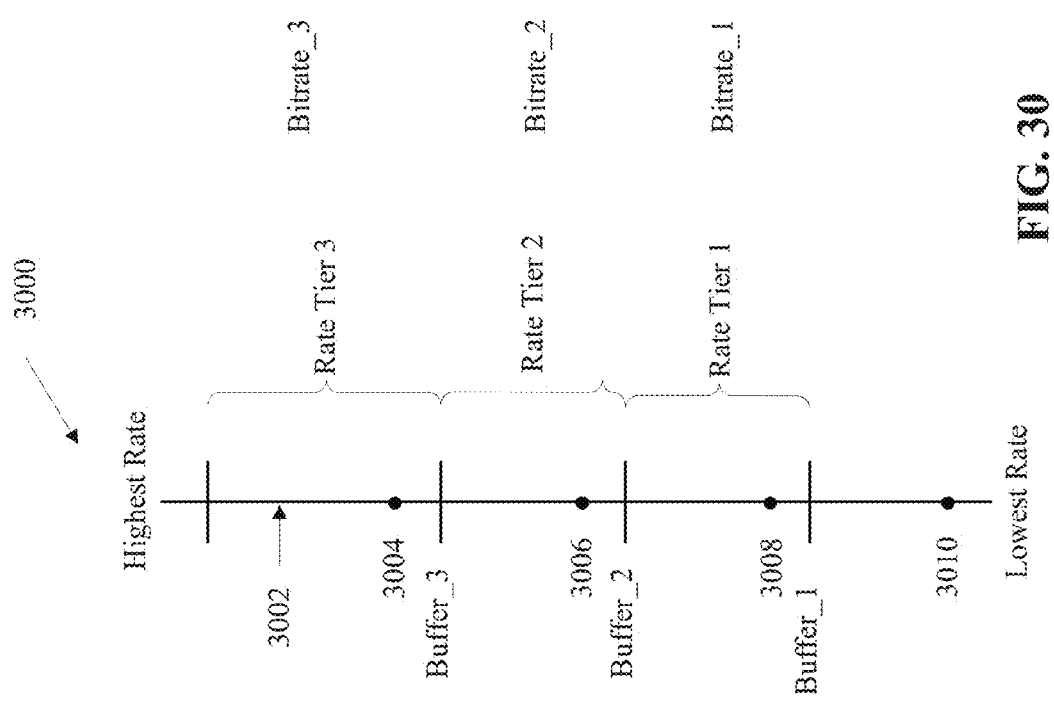

USER INTERFACE AND PROGRAM GUIDE FOR A MULTI-PROGRAM VIDEO VIEWING APPARATUS

CROSS REFERENCE TO RELATED APPLICATIONS

This patent application claims the benefit of priority of the U.S. Provisional Patent Application No. 61/679,611, filed Aug. 3, 2012 and the U.S. Provisional Patent Application No. 61/679,639, also filed on Aug. 3, 2012. The entire contents of the before-mentioned patent applications are incorporated by reference as part of this document.

TECHNICAL FIELD

The present application relates generally to the field of digital video systems.

BACKGROUND

Consumer devices such as tablet computers and smartphones are increasingly being used to receive and view video programs. However, it is still cumbersome for a user to use the user's device to browse through a selection of available video programs.

Popularity of the Internet as the network for video delivery to users continues to grow. Internet Protocol (IP) packet allows seamless video delivery over heterogeneous networks such as wired and wireless networks. As the computational power of user devices such as mobile phones and tablet computers grows, so does a user's ability to receive and view multiple and/or higher bandwidth video programs.

SUMMARY

The present document discloses various user interface arrangements suitable for displaying to a user multiple video programs and titles on a same screen and receiving from the user commands for performing viewing operations such as play, pause, fast forward, rewind, add a video, delete a video, and so on.

In some embodiments, the disclosed interface arrangements can be displayed on a touch-sensitive display. A user can perform simple gesture operations such as tap, double tap, swipe, pinch in, pinch out, and so on, to cause changes in the displayed content and delivery of the content.

In some embodiments, the disclosed interface arrangements can be displayed on a mouse-driven display such as a television screen (where a remote control can operate as the mouse), a personal computer, a laptop, and so on.

The disclosed techniques can be embodied into computer systems comprising a processor and a memory storing instructions for execution by the processor to implement the disclosed methods. The disclosed techniques can be embodied as processes comprising disclosed operations. The disclosed techniques can be embodied in a computer-readable medium as a set of executable instructions. The disclosed techniques can be embodied in a wireless device such as a smartphone or a tablet computer comprising a touch-sensitive screen, a processor for displaying menu on the screen and receiving user interactions with the screen. The disclosed embodiments may be implemented of a server comprising a processor, program instruction storage memory, video data and a network interface for transmitting video data.

In yet another aspect, a technique implementable at a video server is disclosed, in which the video server adjusts the transmission bitrate of a video program using information about the fullness of video buffer at the receiving client device. In some embodiments, the delivery bitrate is reduced/increased corresponding to decrease/increase in the buffer fullness at the client device. In some configurations, multiple buffer fullness thresholds and corresponding multiple rate tiers are used. The technique may be implemented as a process, one or more modules and may be stored as code on a computer-readable medium such that reading and executing the code causes a processor to implement the technique.

In yet another aspect, a technique implementable at a client device is disclosed. At a client device, a video buffer is maintained to store received video data prior to decoding and presenting to a user as a video program. The buffer fullness is monitored and reported to the server sending the video data. In some implementations, a buffer fullness message is sent to the server when requested by the server. In some implementations, a buffer fullness message is transmitted to the server using a fixed value (e.g., once every second) that is determined a priori either by the client or through a control message by the server.

These and other aspects are described in greater detail below.

BRIEF DESCRIPTION OF THE DRAWINGS

FIG. 30 is a pictorial representation of a mapping between client buffer fullness and video delivery bitrate.

DETAILED DESCRIPTION

Figure 1:
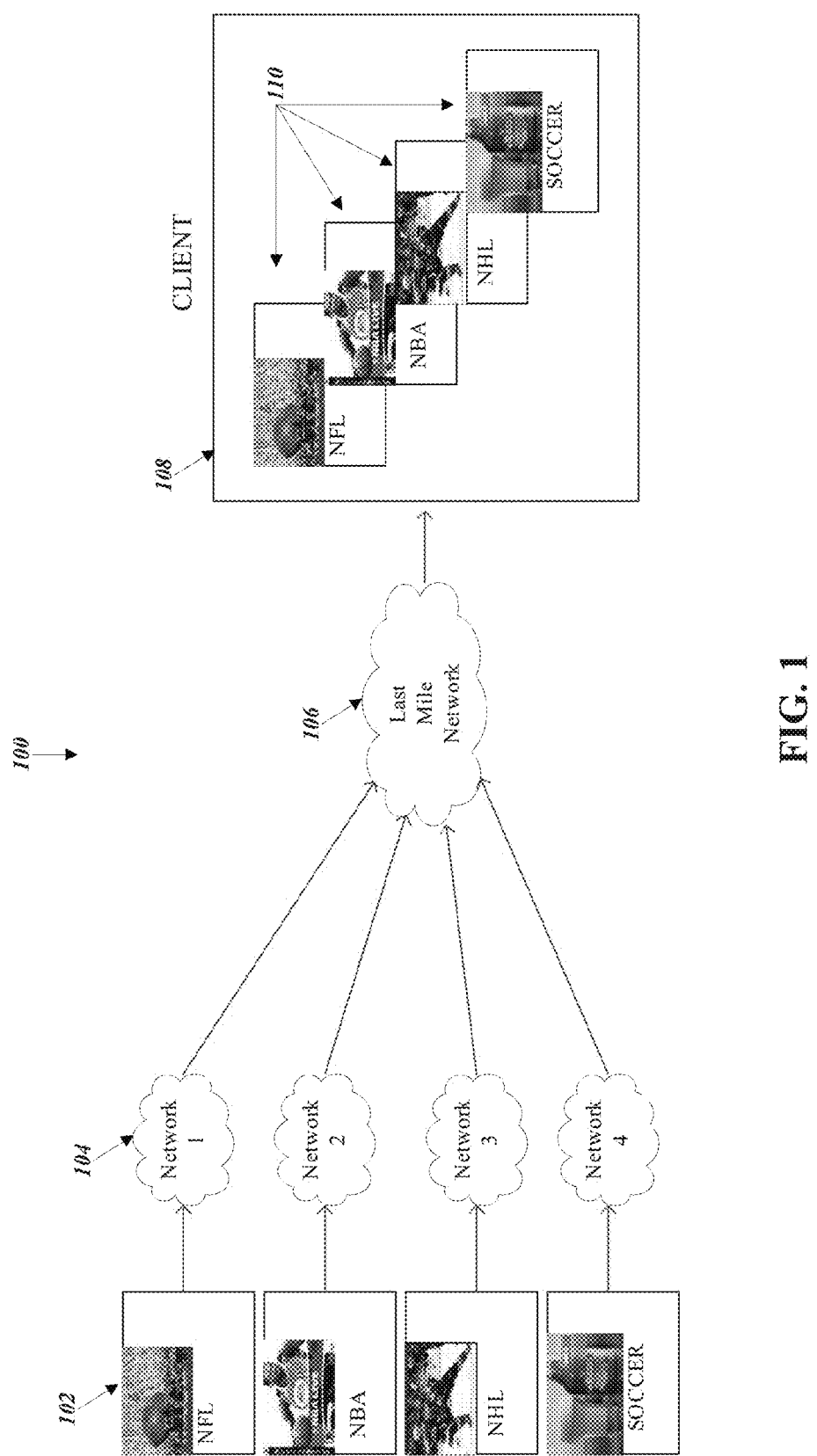
FIG. 1 is a block diagram representation of a system in which a single client device is configured to display multiple video programs from multiple video sources over a network.

With the ubiquitous availability of Internet connectivity, the Internet is fast becoming a transport layer for communication of multimedia content such as audio and video. The availability of World Wide Web is transforming the traditional broadcast video model into a user-selected video model in which a user is able to browse for media content, e.g., using web interface, and select one or more programs for viewing.

Often, media content for such a personalized viewing is transferred over an internet connection provided by a network service provider who also provides media services. For example, a user may subscriber to high speed Internet access using a cable or phone line network from a network service provider (e.g., cable modem or digital subscriber line Internet access), who also may be able to provide television program services to the user (e.g., analog or digital cable programming). Such a personalized content viewing is sometimes called "over the top" distribution of content because content may be transferred from a content provider's web site to a user device over an Internet connection offered by a network service provider who may not have any type of business arrangement with the content provider.

While such developments in the Internet and media content offerings has expanded number of videos that are available to a user for instant viewing, several operational challenges still remain to be solved. For example, current content server solutions do not scale well with the number of users and the number of video programs being concurrently served out to the users. Furthermore, at a user device, a user is typically limited to being able to watch a single video program at a time; with the ability to change programs ("channel change") still requiring the user to exit out of a video window and go to another screen or page for browsing what else is available for viewing.

The techniques disclosed in this patent document, in one aspect, may be used to solve the above-discussed operational limitations of personalized multiview video, and others. In one aspect, the disclosed techniques can be implemented at a server such that none or minimal extra computations are required at a server to serve out a content stream that includes multiple video programs to a user. In another aspect, a client device that currently supports viewing of a single video program can be upgraded using the disclosed techniques to enable viewing of multiple independent programs at the client device, with the ability to seamlessly change the "main view" video program.

The present document discloses various user interface arrangements suitable for displaying to a user multiple video programs and titles on a same screen and receiving from the user commands for performing viewing operations such as play, pause, fast forward, rewind, add a video, delete a video, and so on.

In some embodiments, the disclosed interface arrangements can be displayed on a touch-sensitive display. A user can perform simple gesture operations such as tap, double tap, swipe, pinch in, pinch out, and so on, to cause changes in the displayed content and delivery of the content.

In some embodiments, the disclosed interface arrangements can be displayed on a mouse-driven display such as a television screen (where a remote control can operate as the mouse), a personal computer, a laptop, and so on.

In one disclosed aspect, techniques for managing bitrate of video being delivered from a server to a client device are disclosed. In some embodiments, the actual or calculated buffer fullness of the client device is used to determine the bitrate of a next segment of video to be sent to the client device. The term segment of video, as used herein, refers to a logical grouping of video data having a same or almost same bitrate of delivery. It is also to be noted that a video segment may be characterized by at least two bitrates—an encoding rate of the video and a delivery or transmission rate of the video.

In another aspect, techniques for controlling streaming rate of video being delivered from a server to a client device are controlled. In some embodiments, the actual or calculated actual network bandwidth for communication between the server and the client device is used to determine the bitrate of a next video segment being sent to the client device. In some implementations, the client device may transmit, and correspondingly the streamer may receive a control message that includes information about the observed network bandwidth from the client's viewpoint. In some implementations, the streamer may estimate available network bandwidth. For example, the streamer may keep track of how fast the streaming application layer module is able to transfer data to the network (e.g., transmission control protocol or TCP layer).

The disclosed techniques can be embodied into computer systems comprising a processor and a memory storing instructions for execution by the processor to implement the disclosed methods. The disclosed techniques can be embodied as processes comprising disclosed operations. The disclosed techniques can be embodied in a computer-readable medium as a set of executable instructions. The disclosed techniques can be embodied in a wireless device such as a smartphone or a tablet computer comprising a touch-sensitive screen, a processor for displaying menu on the screen and receiving user interactions with the screen. The disclosed embodiments may be implemented of a server comprising a processor, program instruction storage memory, video data and a network interface for transmitting video data. These and other aspects are described in greater detail below.

In the description below, section headings have been used to facilitate readability of the document only, and the headings are not to be interpreted as limiting the disclosed techniques in any way.

1. Abbreviations and Definitions

| Abbreviations | Description |
| --- | --- |
| AV | Audio and video interleaved media flow |
| DOCSIS | Data Over Cable System Interface Specification |
| DTS | Decode time stamp |
| f-MP4 | Fragmented MP4 container or format |
| Flow | An interleaved audio-video flow consisting of a single video elementary stream, one or more audio elementary stream, and one or more subtitle or data streams |
| HLS | HTTP live streaming, Apple Inc.'s open streaming protocol. http://en.wikipedia.org/wiki/HTTP_Live_Streaming |
| HTTP | Hypertext Transfer Protocol is an application protocol for distributed, collaborative, hypermedia information systems. HTTP is the foundation of data communication for the World Wide Web. http://en.wikipedia.org/wiki/Hypertext_Transfer_Protocol |
| iOS | Apple Inc.'s mobile operating system (formerly iPhone operating system) |
| LFE Channel | Low frequency effects channel for audio |
| Media | Same as Flow |
| MPTS | Multi-program transport stream |
| PTS | Presentation time stamp |
| SPTS | Single program transport stream |
| TS | Transport stream |

2. Introduction

With reference to FIG. 1, a network architecture 100 is shown in which multiple videos delivered from multiple websites to a single client going thru various channels. As depicted, a user may be able to access different content providers' 102 delivered via multiple networks 104 (or segments of the Internet) over the last mile network 106 (typically DOCSIS cable modem network or digital subscriber loop DSL network) at a client device 108. The content may be reproduced to a user via plural instances 110 of application programs such as a Windows Media player or a QuickTime player. The problem associated with this architecture are:

1. Final mile bandwidth bottleneck: All programs being accessed by a user have to travel together over the last mile network 106. Often, the network bandwidth available to a single user over the last mile network 106 changes with time or is capped at an upper limit by the user's internet service provider.

2. Fast switching from one stream to another: For a variety of reasons, including operating system latency in application toggling and buffering requirements, switching from one stream to another stream may take an unacceptably long time.

3. Pauses, bufferings and interruptions on each stream due to the varied channels and their imitations: Because content from different content providers 102 shares a same channel (last mile) without any coordination among the content providers, bandwidth swings in one content transferred from one content provider may impact the quality of video received from another content provider.

This document provides various techniques that can be used in some implementations to address the above-discussed operational issues. This document describes the techniques as being implemented in software on a server but such a description is provided only for the sake of simplifying the understanding of the concepts. Actual implementations can use a mix of hardware and software. For example, some implementations can use hardware processing blocks for faster execution or can be entirely implemented in hardware.

In some implementations, one or more media flows are inputted to the software. Each input media flow may include one video elementary and one or more audio and data elementary streams. Thus, there may be multiple media flows entering into the software solution.

In some implementations, the output is a single composed media flow created out of multiple input media flows comprising of one video elementary stream, one or more audio and data elementary streams.

The input media flows can be added, dropped or changed. For example, if the input consists of 3 media flows F1, F2 and F3, then a flow F4 can be added at any time, a flow (e.g., F3) can be dropped or all existing flows can be replaced with new flows F5 and F6. The output flow is an instant composition of the input flows at any point in time.

The solution can be configured to compose a set of flows of a given user and switch quickly to a separate set of flows to a different user. This way the CPU usage in our solution can be shared between multiple clients by using the CPU power for different users at different time.

3. What is Personalized Multiview?

Multiview is the ability to view multiple video and audio streams simultaneously on a single screen. The uniqueness of this algorithm is that this capability is offered at no extra computation on the server, no extra bandwidth and no special features required on the client device.

Figure 2:
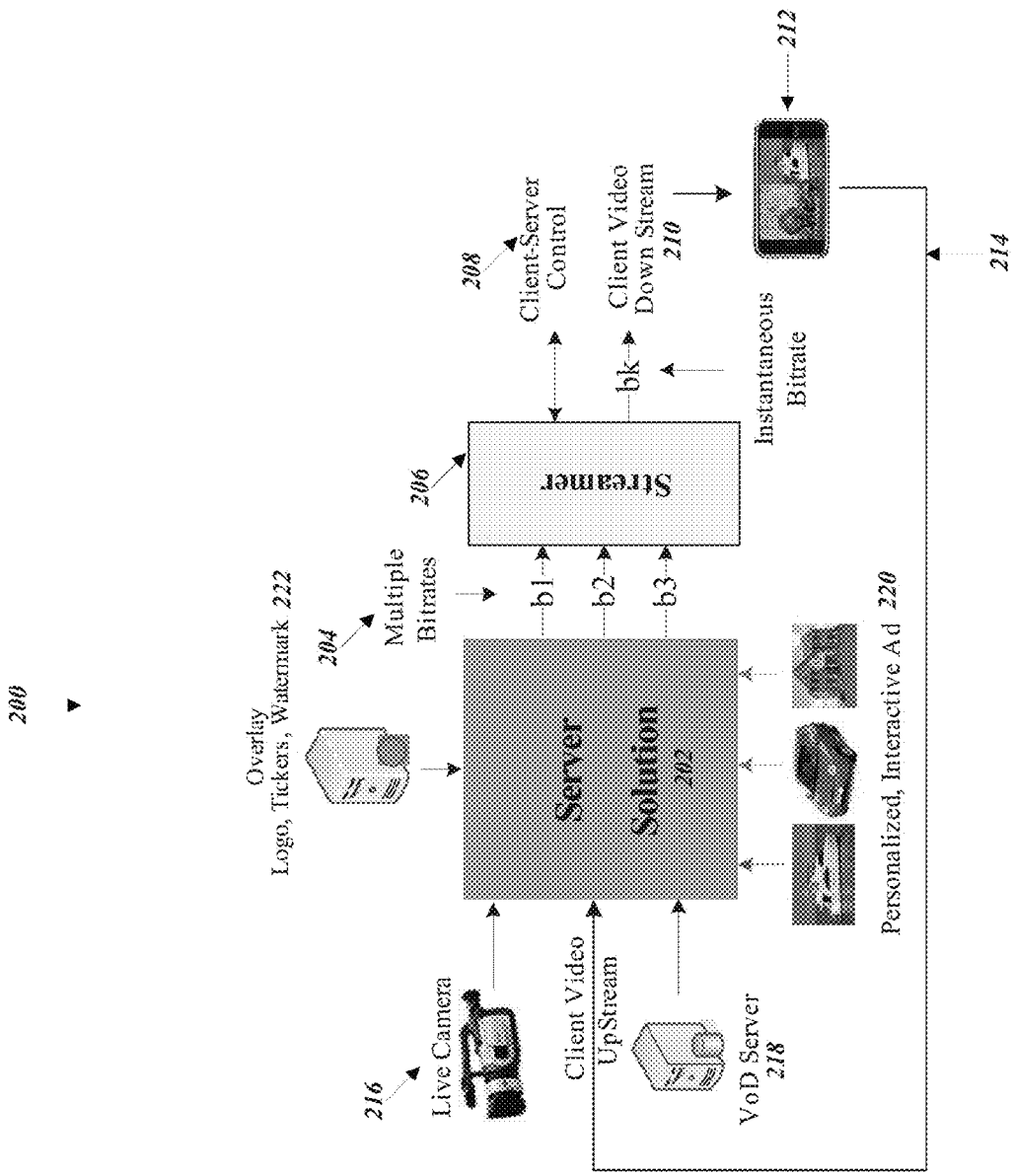
FIG. 2 depicts an example server configuration.

With reference to FIG. 2, one example of a personalized multiview system 200 architecture is shown. Personalization allows the user/client to make their own combination of media at will whereby each user can choose his/her own set of videos/media to watch and select where each media should be there on the screen. We define primary media as the AV stream which takes the largest screen area for video and has associated audio. The secondary media are those which are smaller in size and typically have no associated audio.

The server solution 202 may provide audio/video programs 204 having different bitrates to a streamer 206. The streamer 206 may transfer a stream 210 to a client device 212. The client device 212 may be, e.g., a smartphone, a tablet computer, a desktop computer, a laptop, etc. The client device 212 may also have the ability to upload videos via a communication channel 214 to the server solution 202. The server solution 202 may also include other multimedia content inputs such as live video camera 216, such as live television events, content from a video on demand (VOD) server 218, an ad server 220 providing personalized or interactive advertisements, an overlay, logo, tickers or watermark server 222, providing additional information such as stock quotes, weather reports, etc., and also providing watermarking input to the server solution 202.

Figures 3, 4:
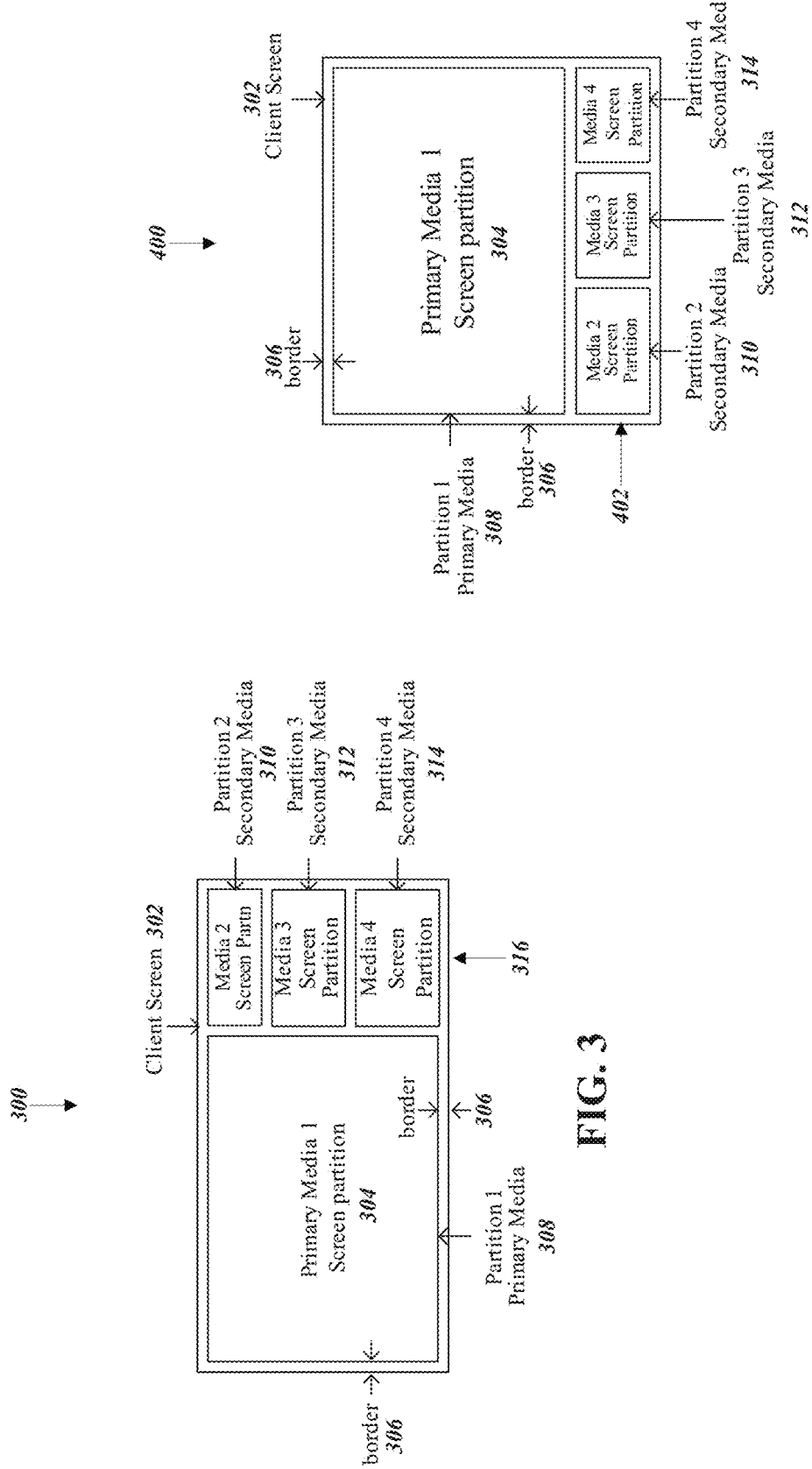
FIG. 3 depicts a possible horizontal partitioning of a client screen.
FIG. 4 depicts a possible vertical partitioning of a client screen.

FIG. 3 depicts an example user interface 300 is shown in which client screen 302 is horizontally partitioned between the primary media screen partition 304 and the secondary media screen partition 316, with multiple secondary media screen partitions 310, 312, 314 being stacked vertically over each other. The user interface 300 may also include optional features such as a boundary 308 delineating the primary media screen partition 304, a vertical border 306 and a horizontal border 306 to the user interface 300 and so on.

FIG. 4 depicts another example user interface 400 in which client screen 302 is vertically partitioned between the primary media screen partition 304 and the secondary media screen partition 402, with multiple secondary media screen partitions 310, 312, 314 being stacked horizontally with respect to each other.

While user interface 300, 400 are shown for illustrative purpose only, several other placements of the primary and secondary screen partitions (e.g., diagonal, spiral, starburst-like, etc.) are possible. Furthermore, in some implementations, when more secondary screen partitions are available than can be fit within a user interface 302, the secondary media screen partitions 316, 402 may be terminated with GUI widgets indicative of continuity to a user. Such widgets include, e.g., triangular arrows, open ribbon cuts, dashes, etc., indicative of additional secondary program windows are available beyond the current borders 306 of the user interface.

4. Single Media Output Flow

Figure 5:
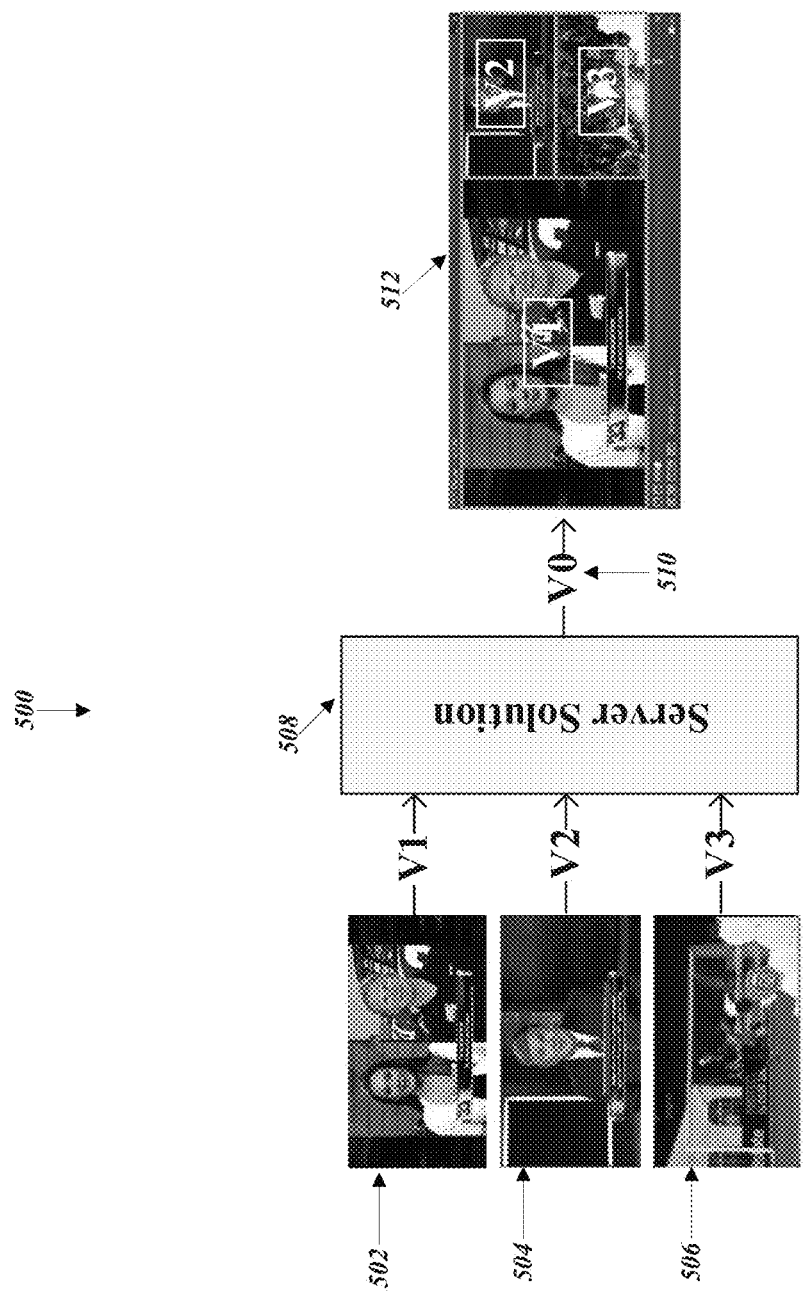
FIG. 5 is a block diagram representation of a system combining multiple video programs into a single display screen.

FIG. 5 is a block diagram representation of a system 500 achieving video composition for creating an output flow 510. Given a number of input media flows 502, 504, 506, the disclosed techniques can create a single output media flow 502. For example, in one implementation, the input media flows are labeled as F1, F2 and F3, where media flow Fi includes interleaved video stream Vi, audio stream Ai and Subtitle stream Si, for i=1, 2, 3. The 3 input flows F1, F2 and F3 may be merged into a single output meda flow F0 consisting of a single video elementary stream V0, audio elementary stream A0, and subtitle stream S0. The output video stream V0 is composed of the input video streams Vi, i=1, 2, 3, as depicted in FIG. 5.

The audio streams can be handled in multiple ways. Some examples are provided below.

Audio from only one flow, say A1 is used on the output, i.e., A0=A1 and the output flow is {V0,A0}.

Audios from one or more flows are mixed into 2, 3 or 4 full-range channels with 0 or 1 LFE channel, i.e., A0=Mix of {A1, A2, A3}, and the output flow is {V0, Mix(A1,A2,A3)}. The audio channel configurations are given in Table 1 below.

Audios from one or more flows become separate streams in the output flow, i.e., output flow is {V0, A1, A2, A3}.

Mixing of audio channels mean combining input audio channels to one of the output channel configurations in Table 1. Note that a mix of multiple audio channels produce a single audio elementary stream.

5. Some Implementation Features

The techniques described in this document offer the following features: Personalized multiview—In some implementations, each user/client can combine his own selection of videos in different resolutions for simultaneous viewing. For example, with reference to user interfaces 300 and 400, in some implementations, a user may be able to change the selection of which program is viewed in the primary window by dragging and dropping the corresponding secondary window into the primary window. For example, when a user device includes a touch-sensitive screen, a user may be able to touch the portion of the screen displaying a secondary content, and drag his finger while maintaining the contact with the touchscreen, from the secondary window to the primary partition, and then breaking the contact by lifting his finger. Such a user action indicates to the user device that the user wishes to "change channel" or toggle the content being watched in the primary window. As discussed in greater detail in this document, in some embodiments, the channel change may cause the transmission of a channel change message from the user device to the server.

Some implementations can process, at the server solution 202, a variety of dissimilar input protocols, formats, codecs, frame rates, sampling rates and coding features. Some implementations can maintain low server density, at near streaming levels. In one aspect, "server density" may refer to how many users or streams can be concurrently supported on a per server basis, using typical implementation technologies such as industry standard interface speeds (e.g., 100M or 1G Ethernet) or processor powers (e.g, Intel i7 series, etc.).

As will be discussed later in this document, in some implementations, generated output streams do not take extra bandwidth based on how many videos are configured to be primary/secondary videos and which one of the video program is presently primary program, for the delivery of multiple videos to the client. In some client-side implementations, a native decoder is used to decode the videos with no requirement for extra features.

TABLE 1

Example Audio Channel Configurations

| Channel name | Index | 1.0 Mono | 2.0 Stereo | 2.1 Stereo | 4.1 Surround | 4.0 Quad | 4.1 | 5.1 | 5.1 Side | 6.1 | 7.1 Front | 7.1 Surround | 9.1 Surround |
|---|---|---|---|---|---|---|---|---|---|---|---|---|---|
| Front Left | 0 | N | Y | Y | Y | Y | Y | Y | Y | Y | Y | Y | Y |
| Front Right | 1 | N | Y | Y | Y | Y | Y | Y | Y | Y | Y | Y | Y |
| Front Center | 2 | Y | N | N | Y | N | N | Y | Y | Y | Y | Y | Y |
| Low Frequency | 3 | N | N | Y | Y | N | Y | Y | Y | Y | Y | Y | Y |
| Back Left | 4 | N | N | N | N | Y | Y | Y | N | Y | Y | Y | Y |
| Back Right | 5 | N | N | N | N | Y | Y | Y | N | Y | Y | Y | Y |
| Front Left of Center | 6 | N | N | N | N | N | N | N | N | N | Y | N | N |
| Front Right of Center | 7 | N | N | N | N | N | N | N | N | N | Y | N | N |
| Back Center | 8 | N | N | N | Y | N | N | N | N | Y | N | N | N |
| Side Left | 9 | N | N | N | N | N | N | N | Y | N | N | Y | Y |
| Side Right | 10 | N | N | N | N | N | N | N | Y | N | N | Y | Y |
| Front Left Height | 11 | N | N | N | N | N | N | N | N | N | N | N | Y |
| Front Right Height | 12 | N | N | N | N | N | N | N | N | N | N | N | Y |

The subtitle channels can be handled as follows:

(a) Only one input subtitle stream is used in the output flow (b) Multiple input subtitle flows can be used in the output flow as separate streams.

(c) Subtitle streams can be encoded.

6. Dissimilar Input and Output Flows

Referring back to FIG. 2, the server solution 202 may handle a variety of inputs 214, 216, 218, 220, 222 such as:

Multiple Input Protocols—File, UDP, HTTP, RTP

Multiple Input Formats—FLV, SPTS, MPTS, WebM, MP4, MOV, 3GP, F4V, f-MP4, ASF, etc.

Multiple Input Video Codecs—H.264, H.265, MPEG1/2/4, H.263, VPx, VCx, MJPEG, ProRes, etc.

Multiple Input Audio Codecs—PCM, MP3, AAC, etc.

The server solution 202 may also operate using a variety of output technologies and formats to generate the client video downstream 210. For example:

Output Video Codecs—H.264, H.265, VP8, etc.

Output Audio Codecs—PCM, AAC, MP3, Vorbis, etc.

Output Formats—FLV, SPTS, MPTS, WebM, MP4, MOV, 3GP, f-MP4, ASF, etc.

Output Protocols—File, UDP, HTTP, HLS, FCGI, RTP, etc.

7. Suitable System Architectures

Figure 6:
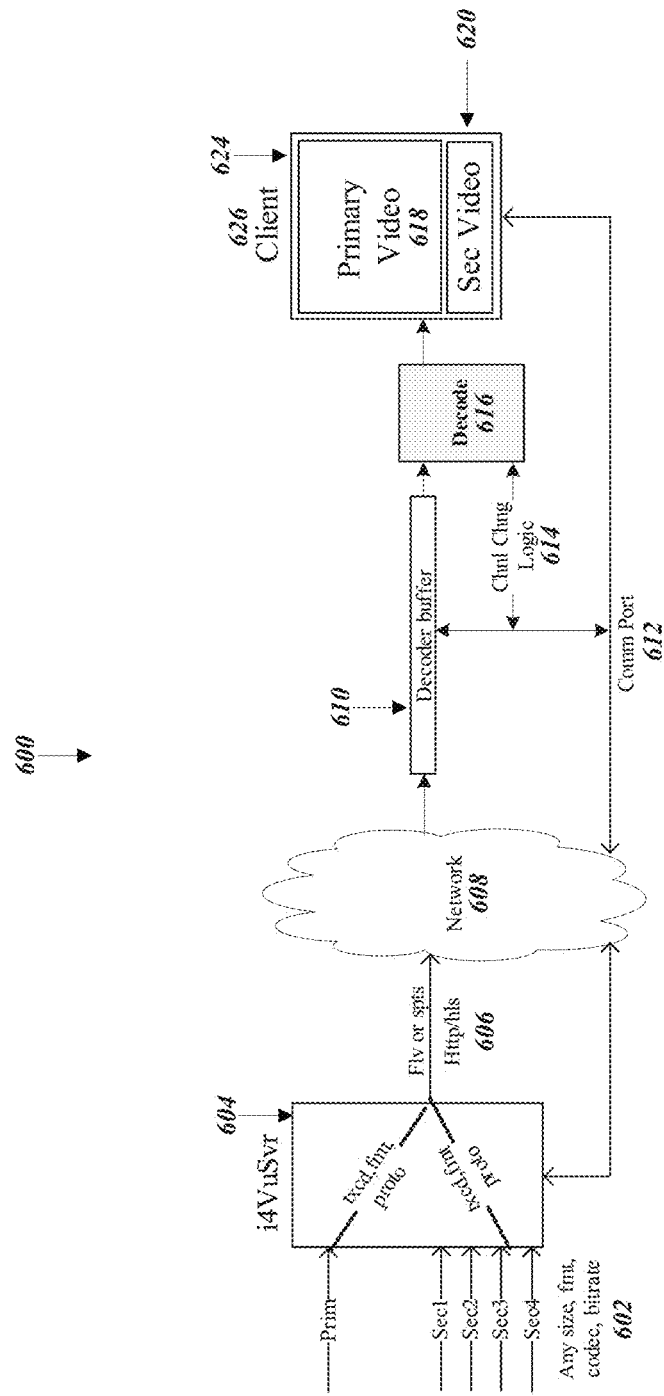
FIG. 6 is a block diagram representation of Architecture 1 for multiview streaming.

This section describes the various architectures where the disclosed techniques can be implemented. Note that these architectures are not limiting and are described for illustration only, Architecture 1:

With reference to FIG. 6, a system 600 for providing multiple audio/video programs to a user is depicted. A server 604 receives multiple media programs 602, including a currently primary video, and zero or more secondary programs. The server 604 may be located at a facility under the control of a service provider or a content provider or a user's home gateway.

In system 600, the server 604 produces a single AV multiplexed output 606 which may in the form of a FLV stream or an SPTS stream or an HTTP/HLS stream. The stream 606 may be transferred over a network 606 (e.g., the Internet, home network, etc.).

At the receiving end, e.g., in a user device, the received media packets may be stored in a decoder buffer 610. From the decoder buffer 610, the packets may be input to a decode function 616. The transfer of data between the decoder buffer 610 and the decode function 616 may also include a channel change logic 614 that controls data packets for which program(s) are sent to the decode function 616. The decoder buffer 610 may also be communicatively coupled to a communication port (path) 612 that provides feedback to the server 604.

At the user device (client device 626), the video programs may be presented to a user at the client display 624 as a primary video 618 and one or more secondary videos 510

In some implementations, all received video programs 602 may be decoded at the server 64 and all but one audio streams are ignored. The relevant audio stream is transcoded, if needed for rate adaption.

The system 600 may thus combine multiple input video frames into a single output video frame by resizing video frames from each stream into a single combined frame. The details of some techniques for achieving such a combination are disclosed in the inventor's U.S. Provisional Patent No. 61/628,783, entitled "MultiView Video Delivery of and Ad Insertion in Over the Top Video", filed on Nov. 7, 2011.

In one example, the server 604 may perform the following steps:

Encode the combined frame into a single output video stream 606.

Use only one audio stream from the input audio streams as the output audio stream.

Multiplex the output video and audio streams into a single multiplex/container 606. Example containers are FLV for flash and SPTS for HLS and iOS.

Stream the multiplex by http or HLS protocols.

On the receiving side, the client 626 decodes the single media stream and displays it on the device.

Figure 7:
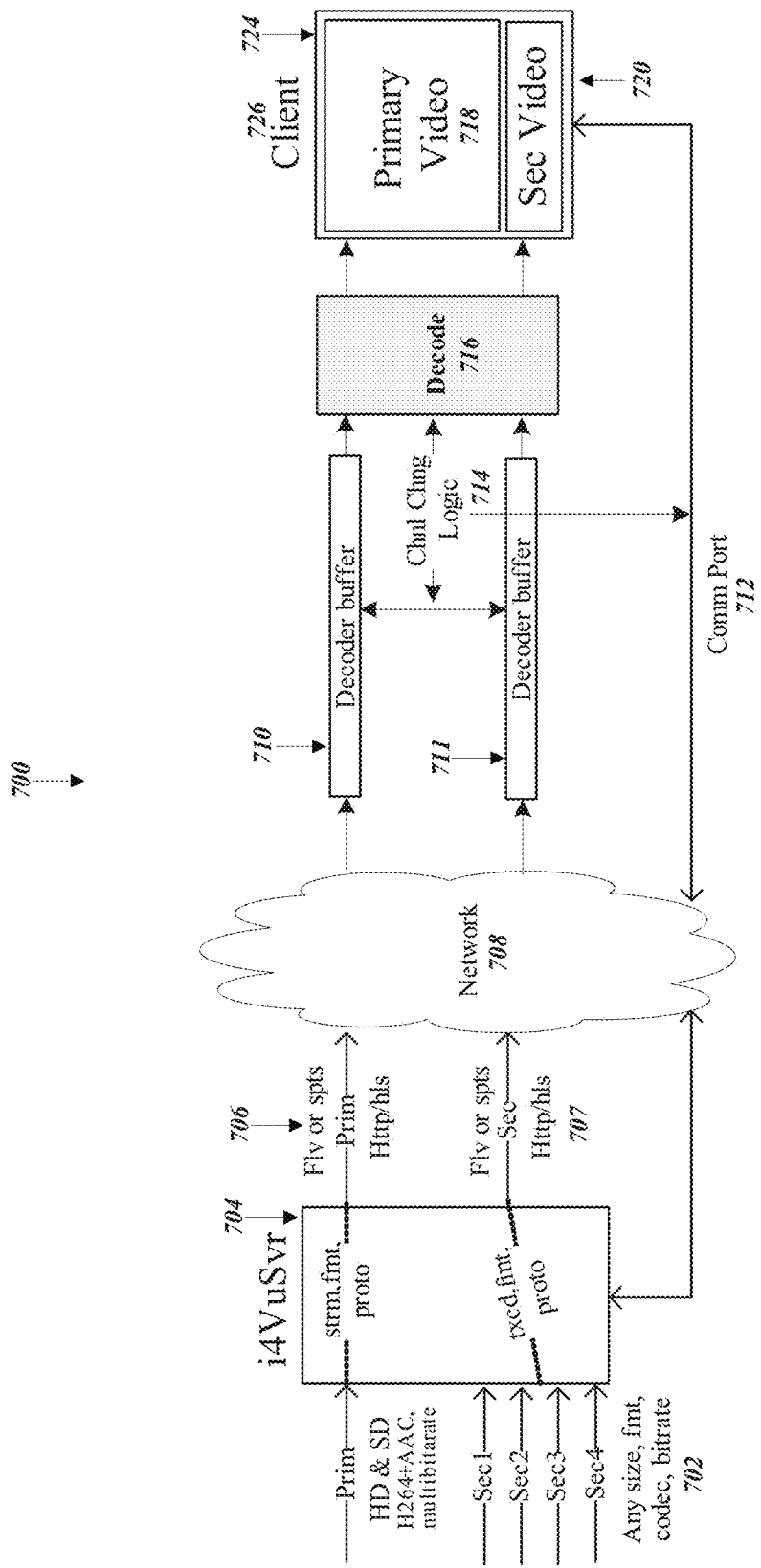
FIG. 7 is a block diagram representation of Architecture 2 for multiview streaming.

Architecture 2:

With reference to FIG. 7, a system 700 is disclosed that, in one aspect, may allow for greater server density compared to the system 600. For example, using today's processor speed technologies, it may be possible to support about 100 clients per server platform 704.

In some implementations, the system 700 may perform original video quality and encryption on primary channel in the incoming programs 702.

The server 704 may produce 2 AV multiplexed outputs 707, 707.

In some implementations, the inputs are split into 2 groups—primary channel 706 containing the main video with audio and occupying the largest screen area of the client 726, and secondary videos 707 with no audio which form the small form factor videos occupying the smaller section of the client screen 724.

The primary media is not decoded, encoded or transcoded. It is instead streamed or copied to output 0.

Changes done to primary media may include conversations from input format and protocol to different output format and protocol, i.e. the system 700 can change the format from say FLV to SPTS and the protocol from input file or HTTP to output HLS.

The secondary media are decoded, combined and re-encoded (similar to system 600) and streamed to output 707. Both streams 706, 707 may be transferred over the network 708, which may be similar to the network 608 previously discussed.

In some embodiments, the system 700 may interleave the two outputs 706, 707 in a time interval such as 200 ms of output 706 is interleaved with 200 ms of output 707.

The client 726 may decode the 2 media streams independently. Two different decoder buffers 710, 711 may be used for the primary and secondary streams 706, 707. Channel change control logic 714 and a reverse communication channel 712, similar to the previously discussed architecture elements 614 and 612 may also be provided. The system 700 may place the primary and secondary videos in locations 718, 720 on the client screen 724, as previously discussed with respect to FIGS. 3 and 4.

Figure 8:
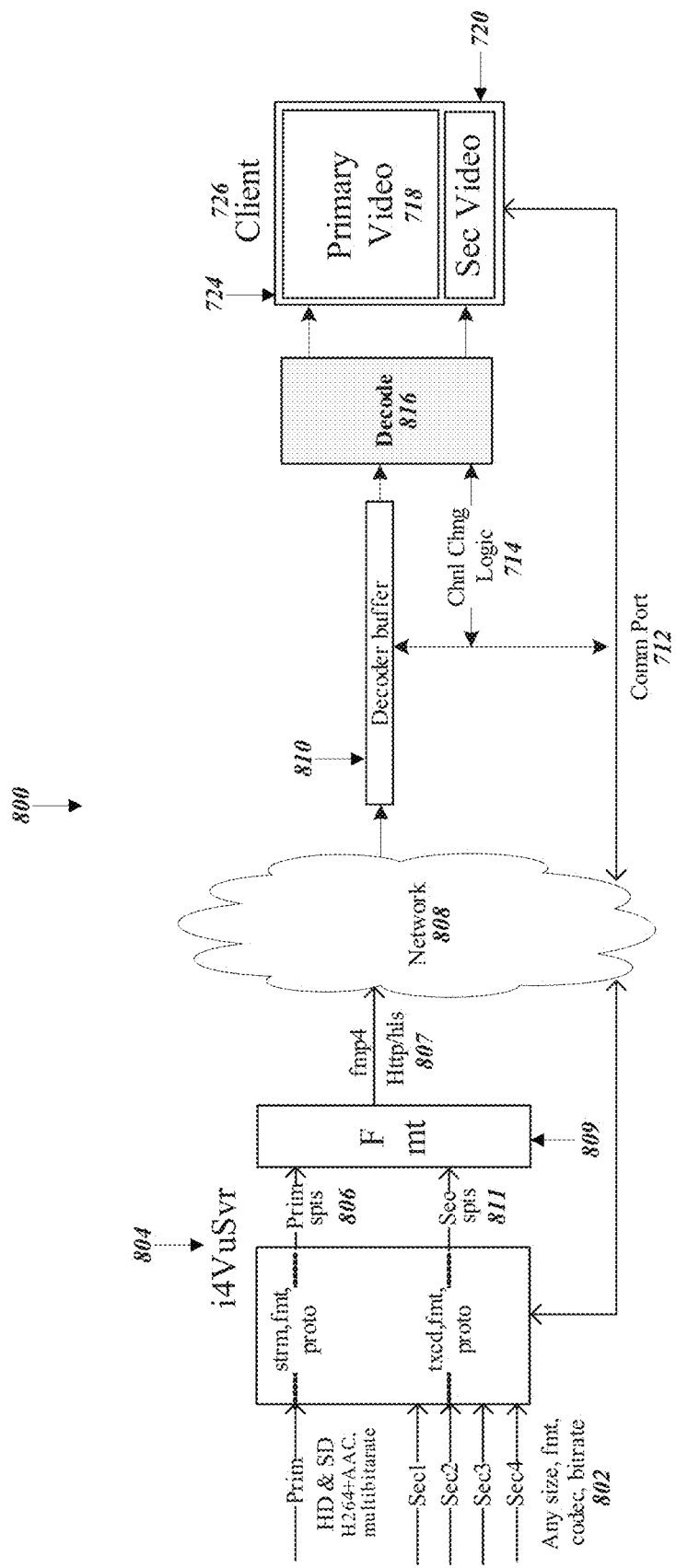
FIG. 8 is a block diagram representation of Architecture 3 for multiview streaming.

Architecture 3:

FIG. 8 is a block diagram representation of a system 800 for delivering multiple programs to a user. Multiple programs 802 are input to the server 804, including a primary encoded (compressed) stream that is output as a primary single program stream 806 and zero or more secondary streams that are formatted and output as secondary SPTS 811. Single container adds to reliability over unreliable networks.

The sever 804 may use techniques similar to server 704, with the exception that the system 800 may interleave the two outputs 806, 811 in a single container 807, using a format interleaver 809. The container 807 can be MPTS or f-MP4. The media content may be transferred from the server 804 to the client 826 over the network 808, which may be similar to previously discussed networks 608 and 708. The client 826 may decode the received stream using a decoder buffer 810 and a decoder 816. The received multiple programs may be decoded and displayed independently on the client screen 724 as specified by the server 804 to the client.

Figure 9:
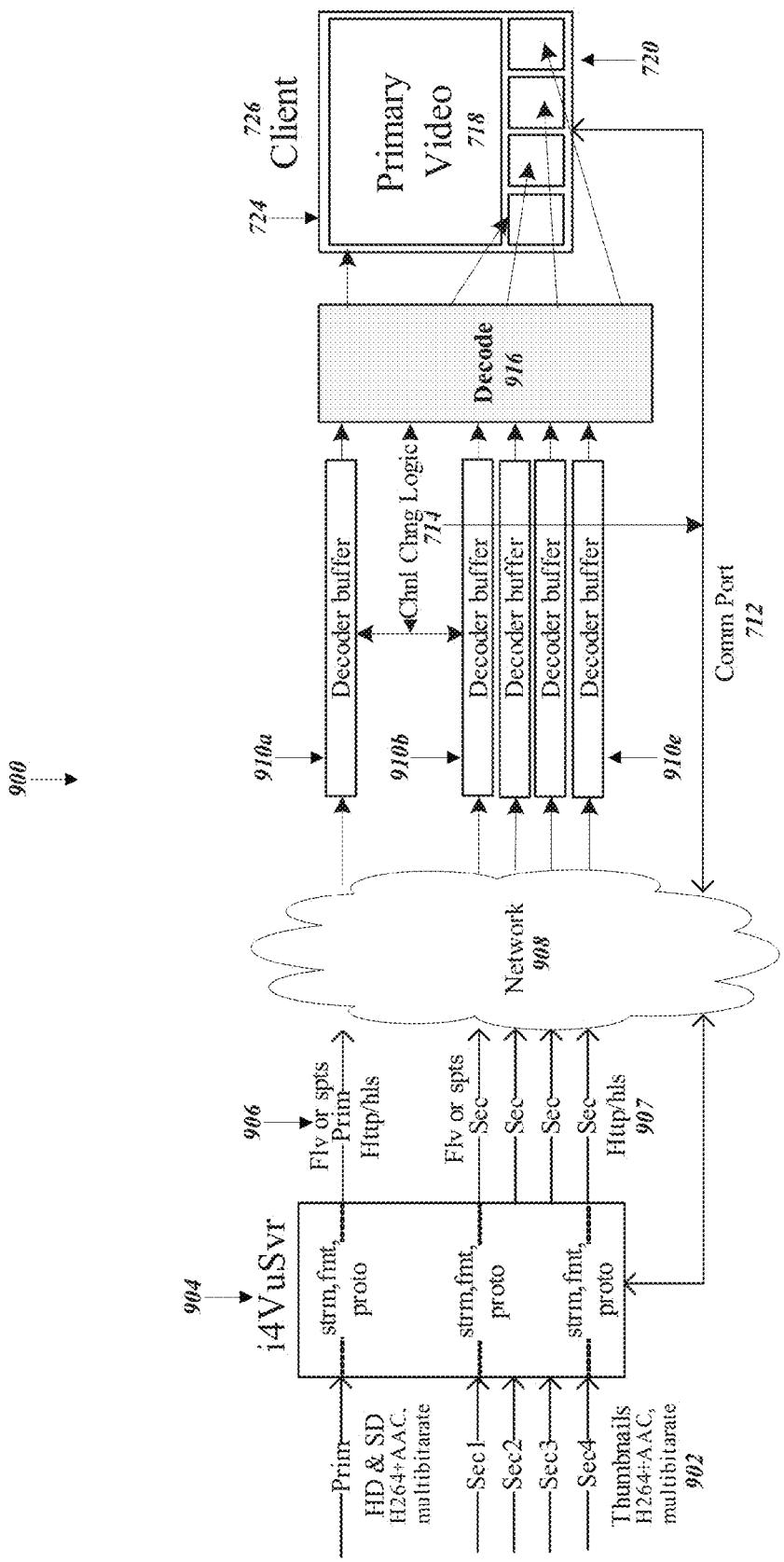
FIG. 9 is a block diagram representation of Architecture 4 for multiview streaming.

Architecture 4:

FIG. 9 shows a block diagram representation of a system 900 that implements Architecture 4. The system 900 may have a high server density, Near streaming density per server. In some implementations, the system 900 may provide original video quality and encryption on primary channel.

In this architecture, the server 904 produces N (>=1) AV multiplexed outputs 906. Thus, in some implementations, for N inputs 902, there are N outputs 906.

All input media 902 are not decoded, encoded or transcoded. They are instead streamed or copied to the corresponding output 906 (primary) or 907 (secondary).

Changes done to each media 902 may include conversions from input format and protocol to new output format and protocol. For example, the format may be changed from say FLV to SPTS and the protocol from input file or HTTP to output HLS.

The client decodes the N media streams independently using decoder buffer 910a, 910b, 910c, etc. And one or more decoder functions 916 and places them at N locations on the client screen specified by the server 904 to the client 726, as described in this document.

Figure 10:
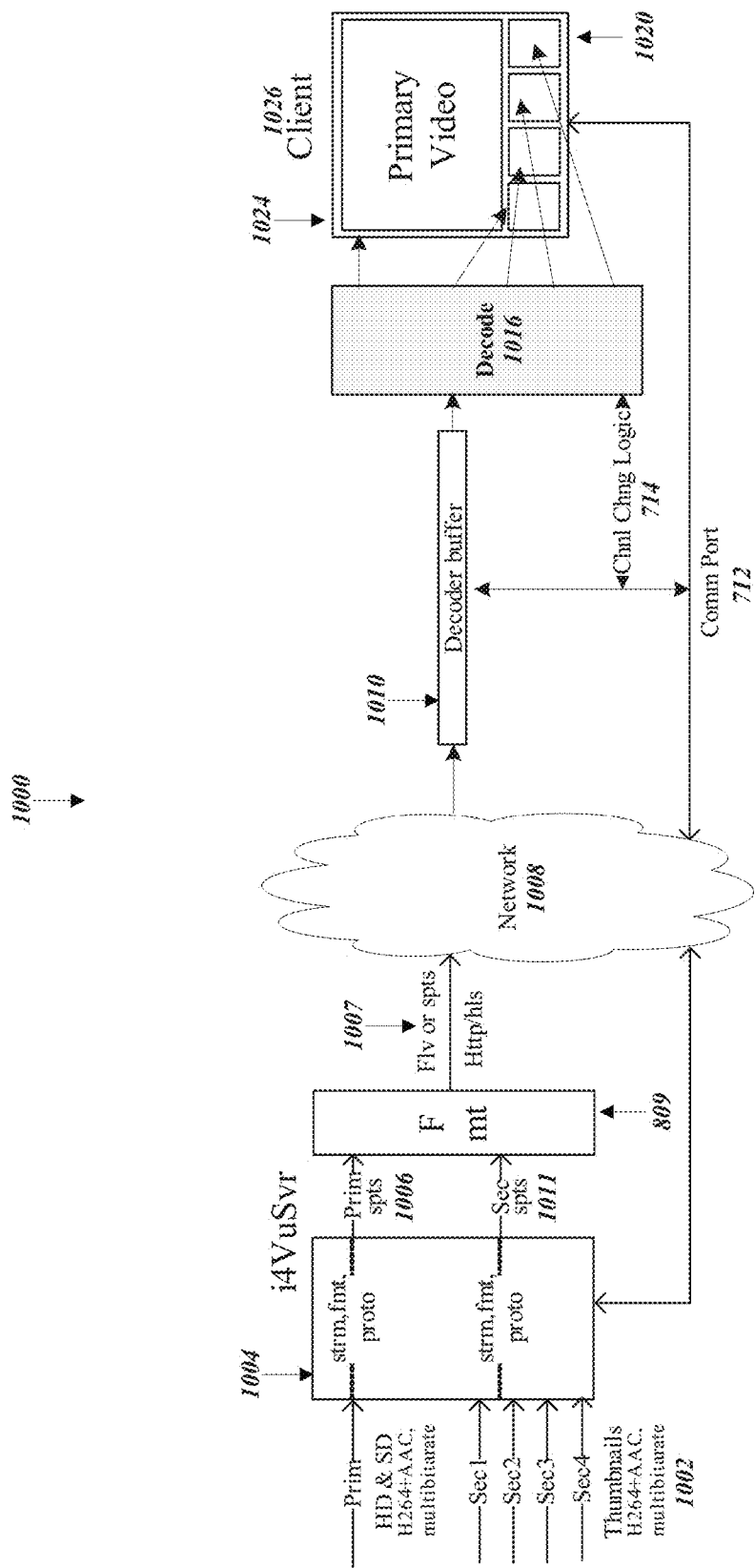
FIG. 10 is a block diagram representation of Architecture 5 for multiview streaming.

Architecture 5:

FIG. 10 shows a block diagram representation of a system 1000 that implements Architecture 5. A single container 1007 is created by interleaving or formatting together (in 809) a primary SPTS 1006 and a secondary SPTS 1011 from the server 1004. The server 1004 creates the primary SPTS 1006 by processing (no decoding, only transcoding) a primary program and the secondary SPTS 1011 is created from secondary programs. In one aspect, the use of a single container 1007 adds to reliability over unreliable networks (e.g., network 1008, which may be similar to network 708, 808, 908).

In one aspect, the system 1000 may enable high server density implementations. In some implementations, high density is achieved to provide near streaming density per server.

As discussed, original video quality and encryption may be used on primary channel.

The server-side processing at server 1004 may be similar to the server side processing performed in architecture 2, with the exception of interleaving the two outputs in a single container. The container can be MPTS or f-MP4. The client 1026 decodes the N media streams independently and places them at N locations on the client screen specified by the server 1004 to the client 1026. The interleaved stream 1007 may be transferred over the network 1008 to a decoder buffer 1010, to the decode function 1016, and displayed on the display 1024 of client 1026 in a primary video window and a secondary video window 1020, as previously described with respect to FIG. 3 and FIG. 4.

Various user interface arrangements are now discussed with reference to FIGS. 11 to 27. It should be noted that while the various video windows and icons are illustrated with static images or cross marks (X mark) to facilitate submission and distribution of this patent document, in operation, these screen regions can display live video (moving pictures). For example, each grid entry in FIG. 11 (marked "NFL", "Trailer", "CNN" etc.) may show moving pictures from the underlying video program.

Figure 11:
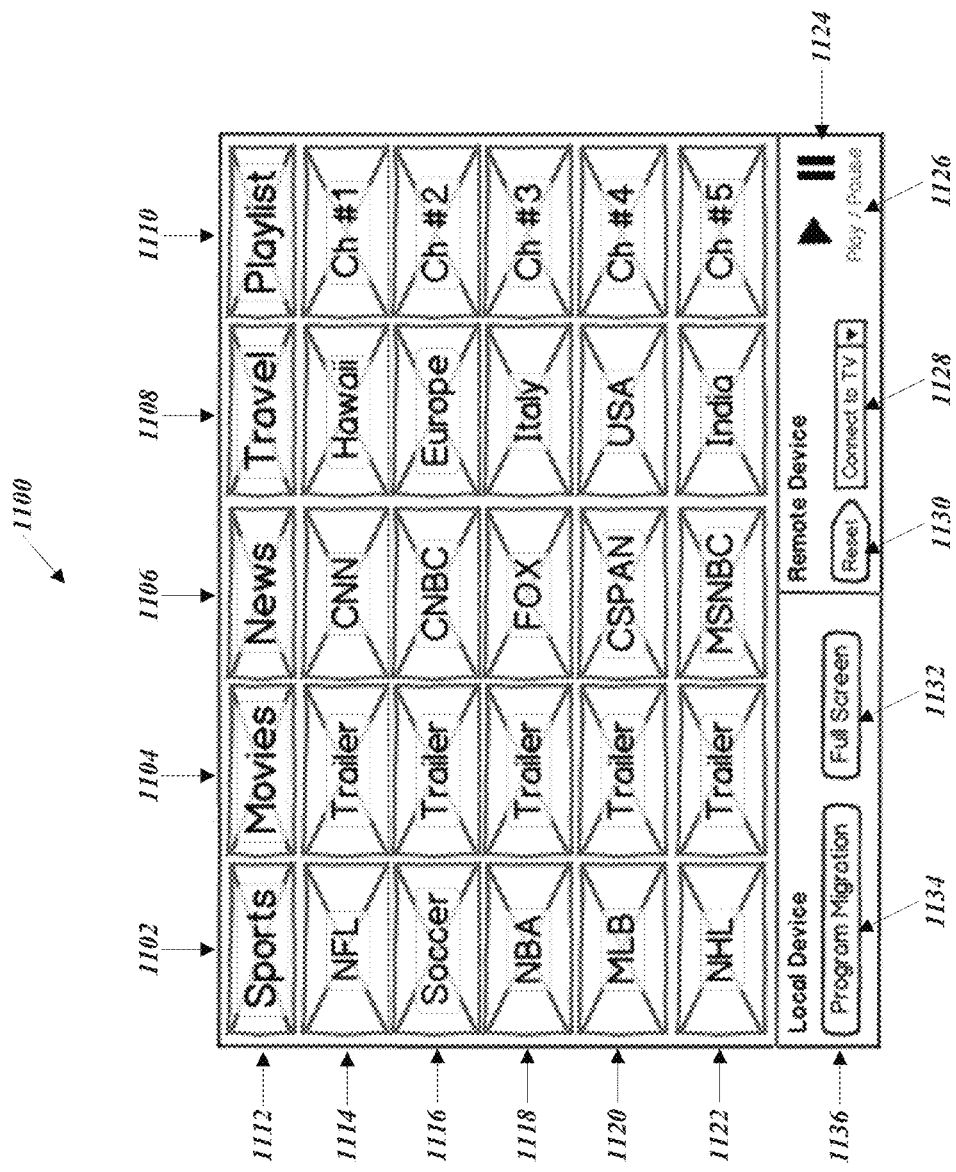
FIG. 11 depicts a user interface example.

With reference to FIG. 11, an example user interface 1100 for displaying interactive program guide display is depicted. Available video programs may be logically grouped in a genre, such as shown in column 1102 (e.g., sports), 1104 (e.g., movies), 1106 (e.g., news) and 1108 (e.g. travel). A playlist column 1110 may list channel numbers that have been added to the place list at various times. The channels may include channels 1112, 1114, 1116, 1118, 1120, and 1122, corresponding to channels 1 to 5 respectively.

The user interface 1100 may facilitate controlling and operating multiple devices by presenting one or more remote device display portions 1124, which may include control features such as a play/pause control menu 1126, a connectivity selection menu item 1128 and a reset switch 1130. Additionally, in a control portion 1136 for controlling a local device, a full screen menu item 1132 and a program migration control menu 1134, and so on.

As illustrated in FIG. 11, and other Figures discussed subsequently in this document, in one aspect, a client device may be configured to operate as a remote control for multiview program guide display and control of another device. For example, user interface display on a phone or tablet computer may provide a program guide to the user and enable a user to select a program and "drag and drop" the selected program or video to the appropriate location on the display such that the program is then displayed on a local screen or a remote screen (e.g., on the local tablet computer screen, or on a television display being controlled by the table computer). In some implementations, multiple devices can be remotely controlled in this manner by a single client device.

Figure 12:
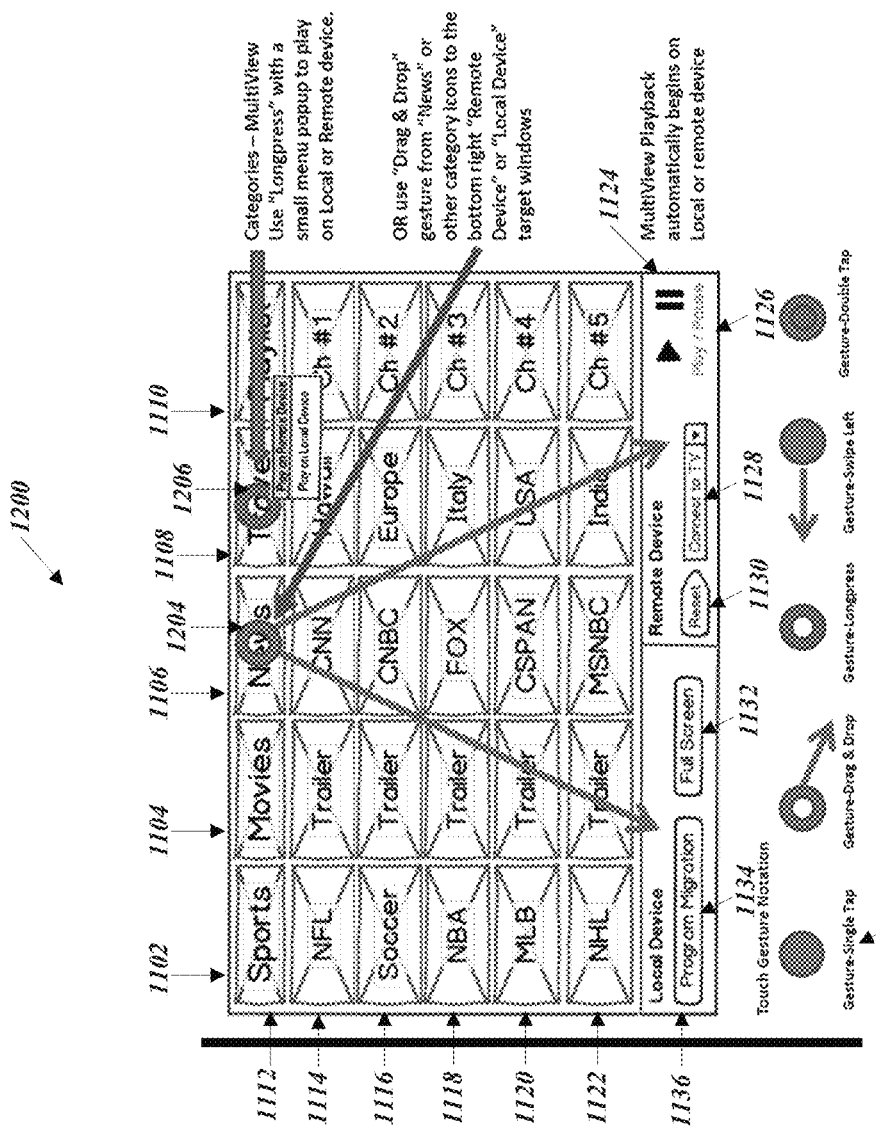
FIG. 12 depicts user interaction with a user interface.

With reference to FIG. 12, a user interface 1200 is depicted. For lucidity of explanation, a notation of various gestures that a user may be able to perform with the user interface 1202 is also depicted in a panel 1202. In actual display of the user interface 1200, the gensture key notation 1202 may be omitted from the display. The user interface 1200 may be displayed and controlled by a processor in a client device such that when a user performs the "longpress" gesture 1204, the menu items 1136 and 1126 may pop up (e.g., below or along side the user interface 1200). Once the menu items 1136 and 1126 pop up, a user may be able to interact with the appropriate control buttons to cause an action to occur at either the local device (device on which the menu is displayed) or a remote device.

Alternatively, a user may be able to drag & drop a specific item (e.g., "news") into one of the local or remote device target windows 1126 and 1136 to cause a corresponding playback on the local or remote device.

Figure 13:
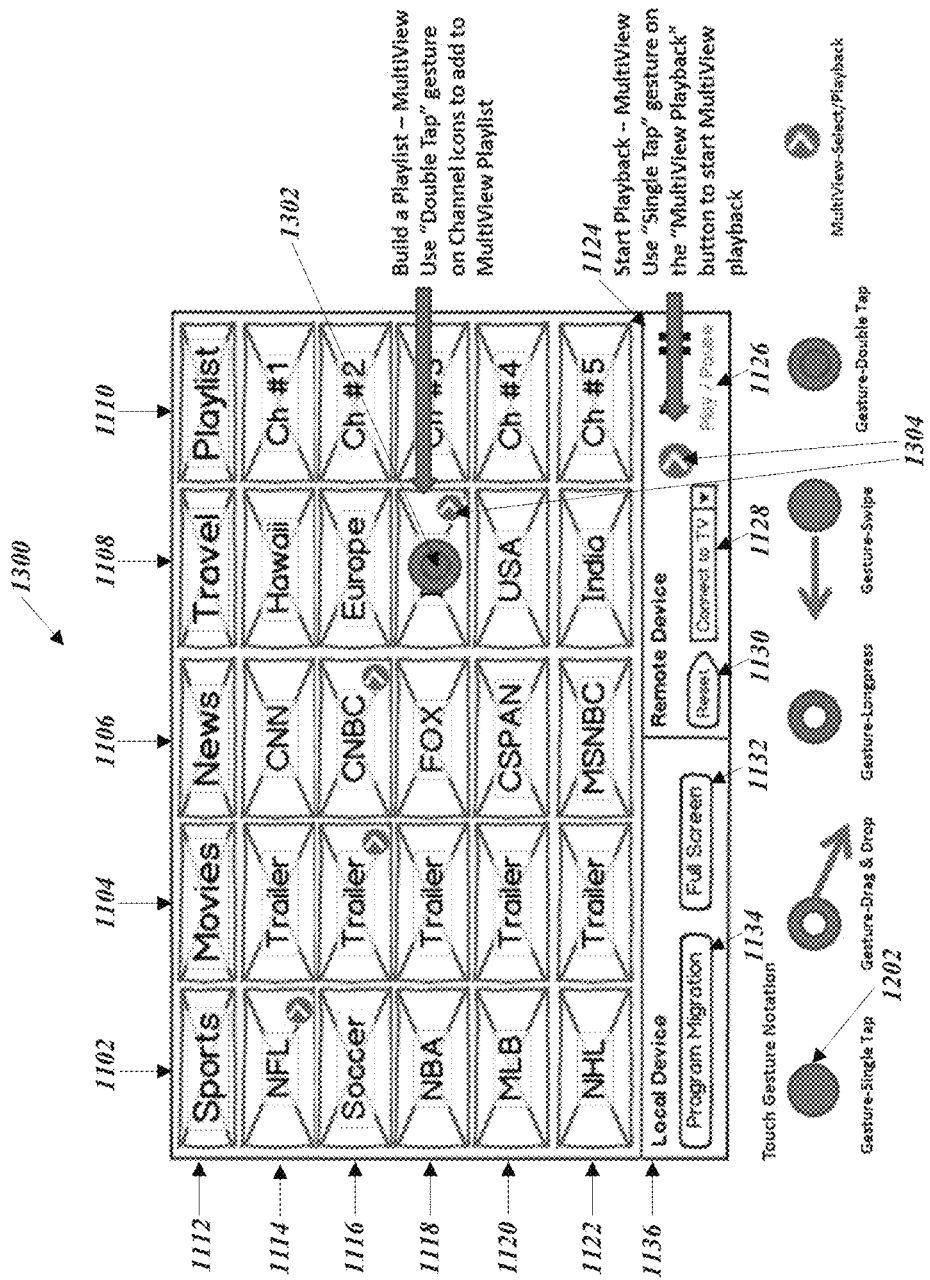
FIG. 13 depicts another user interaction with a user interface.

With reference to FIG. 13, the operation of how a user can build a playlist is explained. A user may be able to double tap a channel icon 1302, instructing the local device to add the corresponding channel to the playlist. When there is at least one program for playback, a multi-view select/playback icon 1304 may appear on the remote device control window 1126. The user may be able to single tap the icon 1304 to start multi-view playback.

Figure 14:
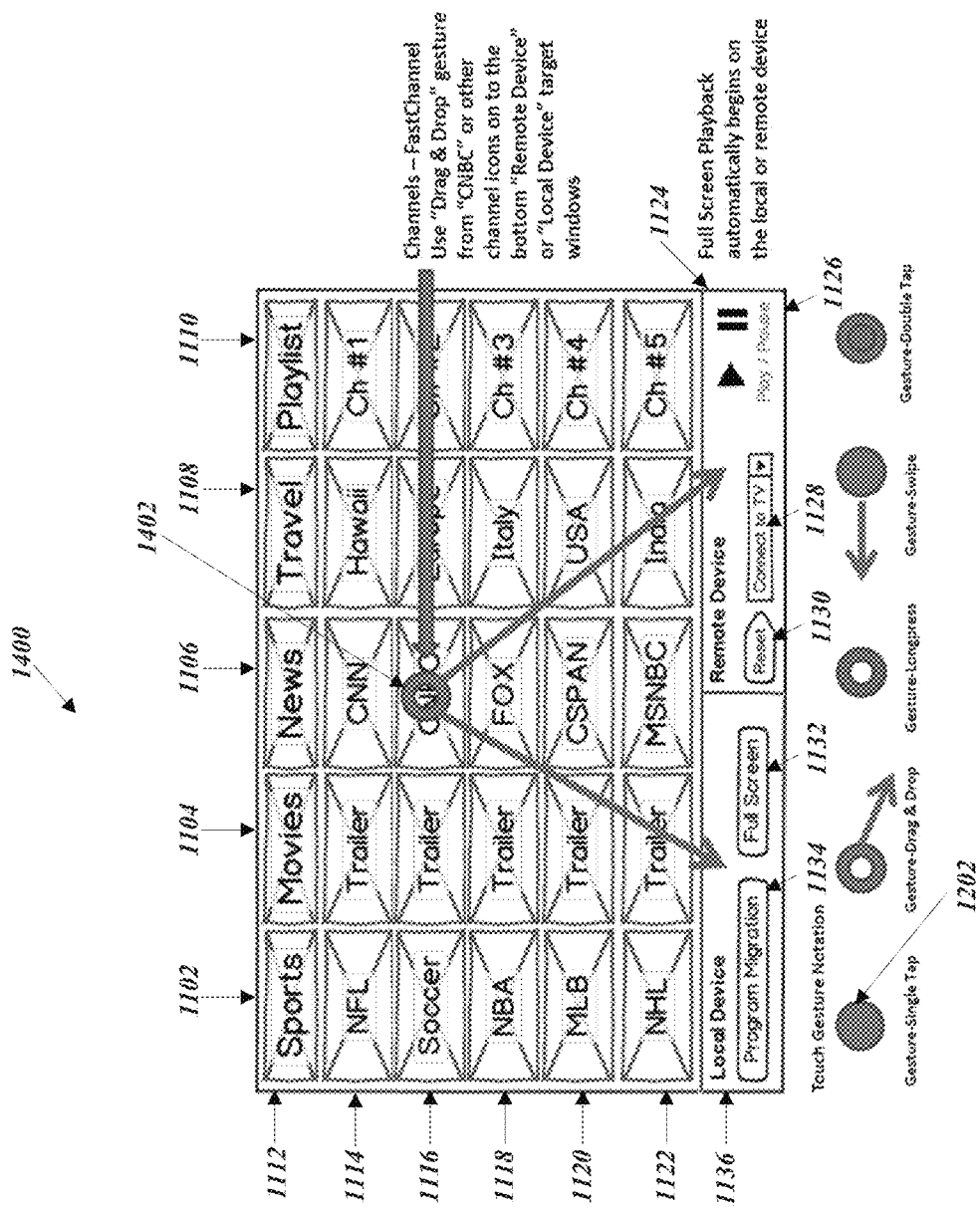
FIG. 14 depicts another user interaction with a user interface.

FIG. 14 shows an example user interface 1400 in which the user is able to user a "drag and drop" touch gesture from a channel icon 1402 of interest to a local device or a remote device to start playback on the local device or a remote device. In some implementations, the local device processor, upon receiving such as gesture from the user, may replace the user interface 1400 with a full screen video output, as previously discussed.

Figure 15:
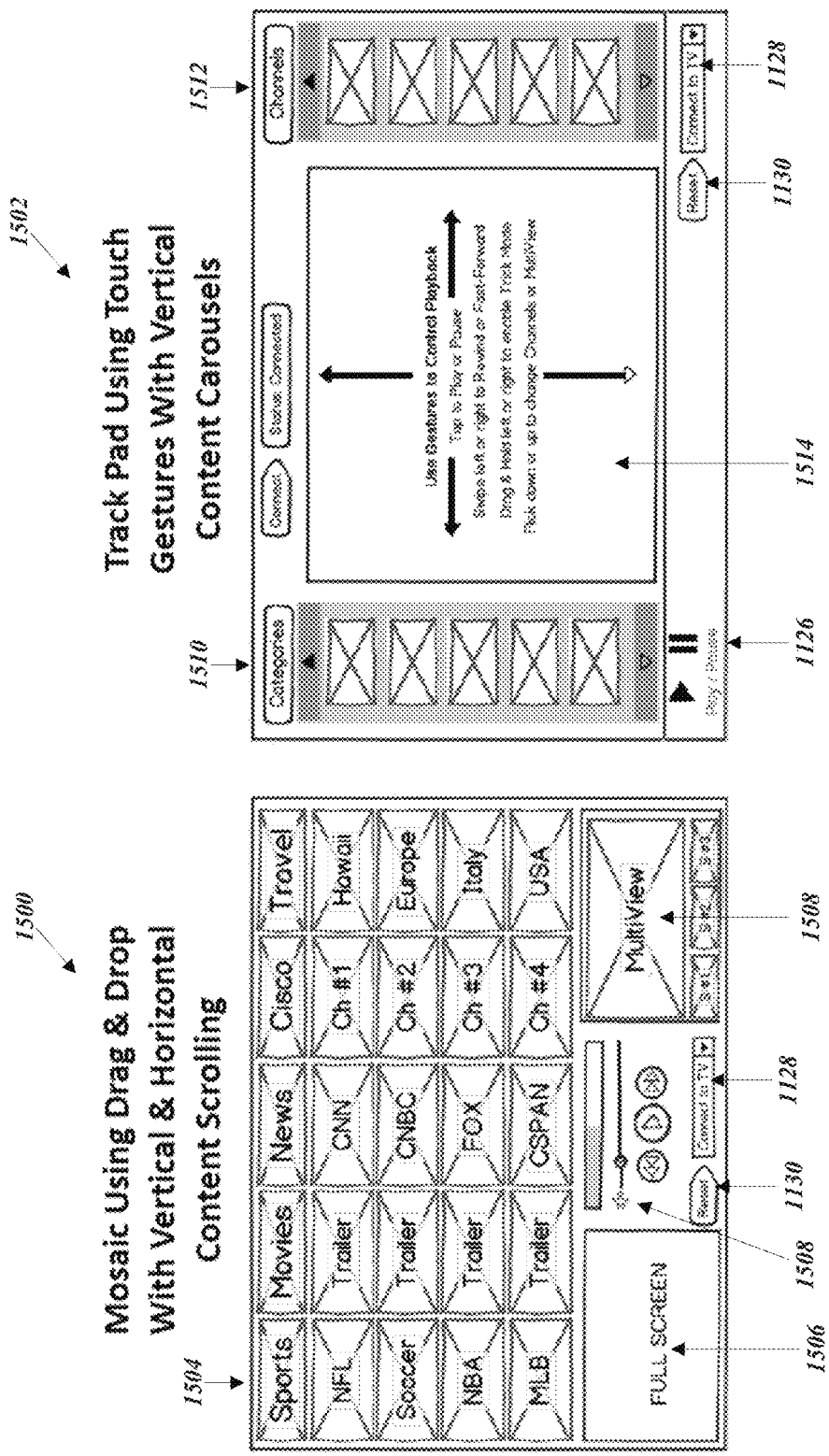
FIG. 15 example user interactions with a touch sensitive user interface.

With reference to FIG. 15, the operation of horizontal and vertical content scrolling is explained as follows. A user may be provided three different options for each displayed program icon, displayed in a guide 1504. In the full screen option, depicted by window 1506, a selected video program is displayed in full screen (i.e., non-transparently or transparently the user interface 1504. In the control window 1508, the user is provide with the options to rewind/fast forward/pause the video program being played. In the control window 1508, previously discussed multi-view program display is provided to the user.

In user interface window 1502, another embodiment is shown in which a screen area 1514 is made available to the user to interact with and control the multi-view operation of the client device. A user may be able to tap to play and pause a video being displayed in the are 1514. A user may be able to swipe left (rewind) or right (fast forward). A user may be able to change channels by a flick up (channel up) and a flick down (channel down). Similarly, a user may be able to change channels by simply dragging and dropping a channel icon from channel list 1512 or a category 1510.

Figure 16:
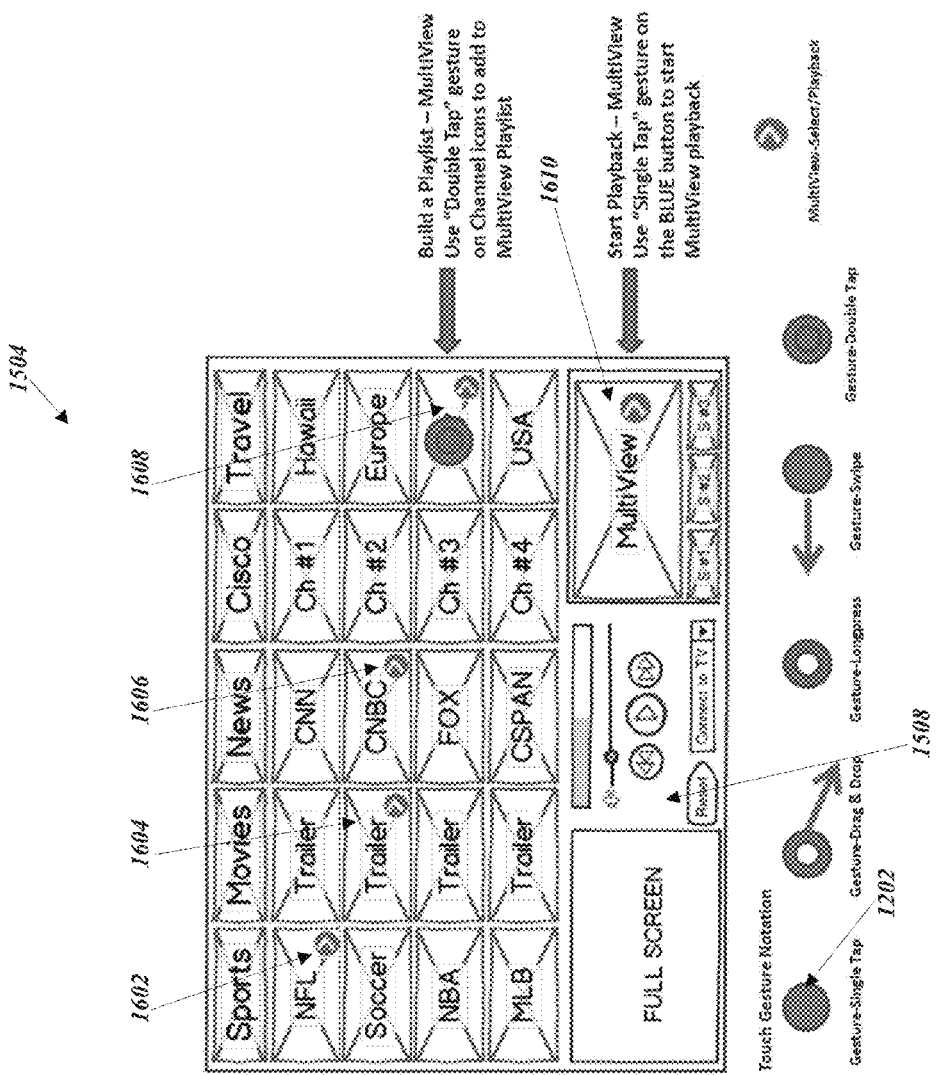
FIG. 16 depicts another user interaction with a user interface.

In FIG. 16, an example embodiment of the user menu 1504 is depicted. A user has built a multi-view play list by double tapping a number of program icons 1602, 1604, 1606 and 1608. The user can then begin multiview program viewing by single tapping the multiview playback button 1610. As previously described, the user may also be able to start viewing the selected program in the full screen mode or in the trick mode display mode 1508.

Figure 17:
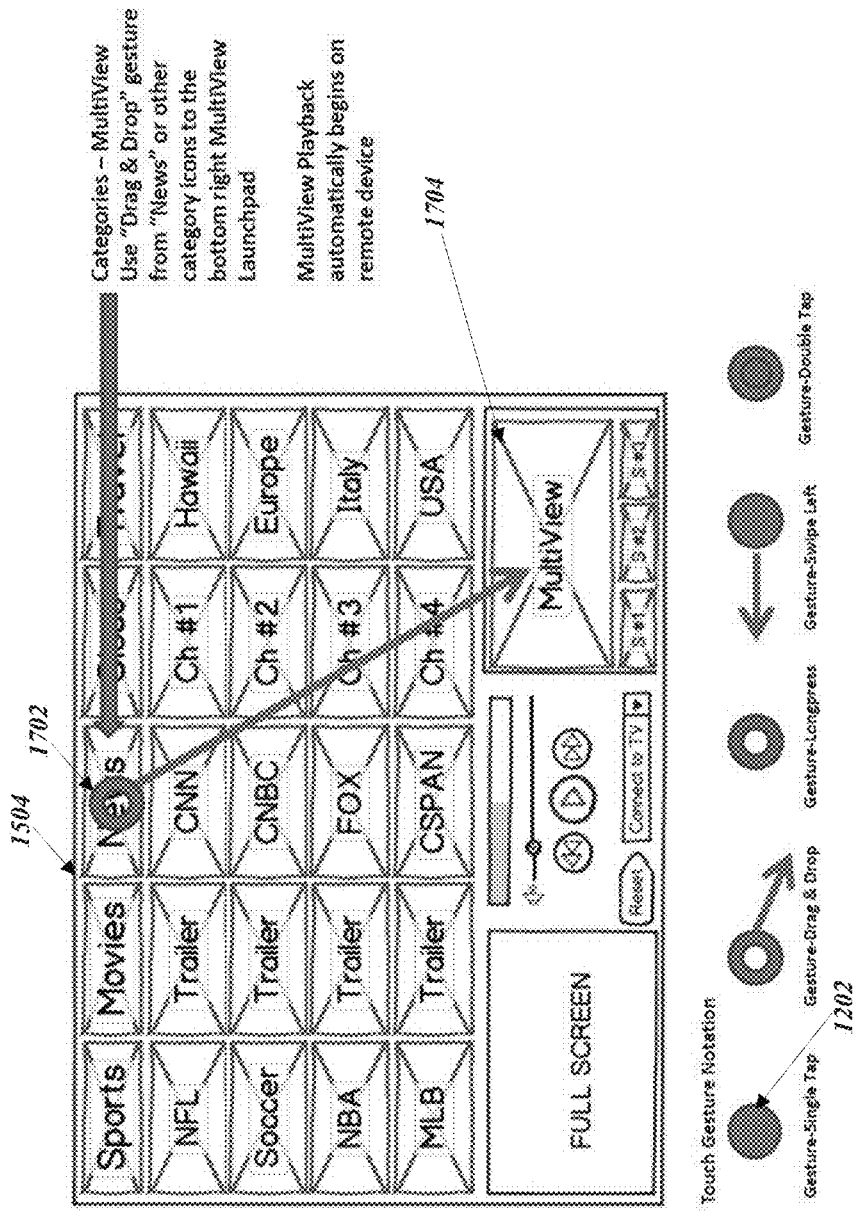
FIG. 17 depicts another user interaction with a user interface.

FIG. 17 shows an example operation of the user menu 1504 in which a user drags and drops a selected program 1702 into the multiview window 1704 for causing the selected program to be displayed on the multiview window on a remote device.

Figure 18:
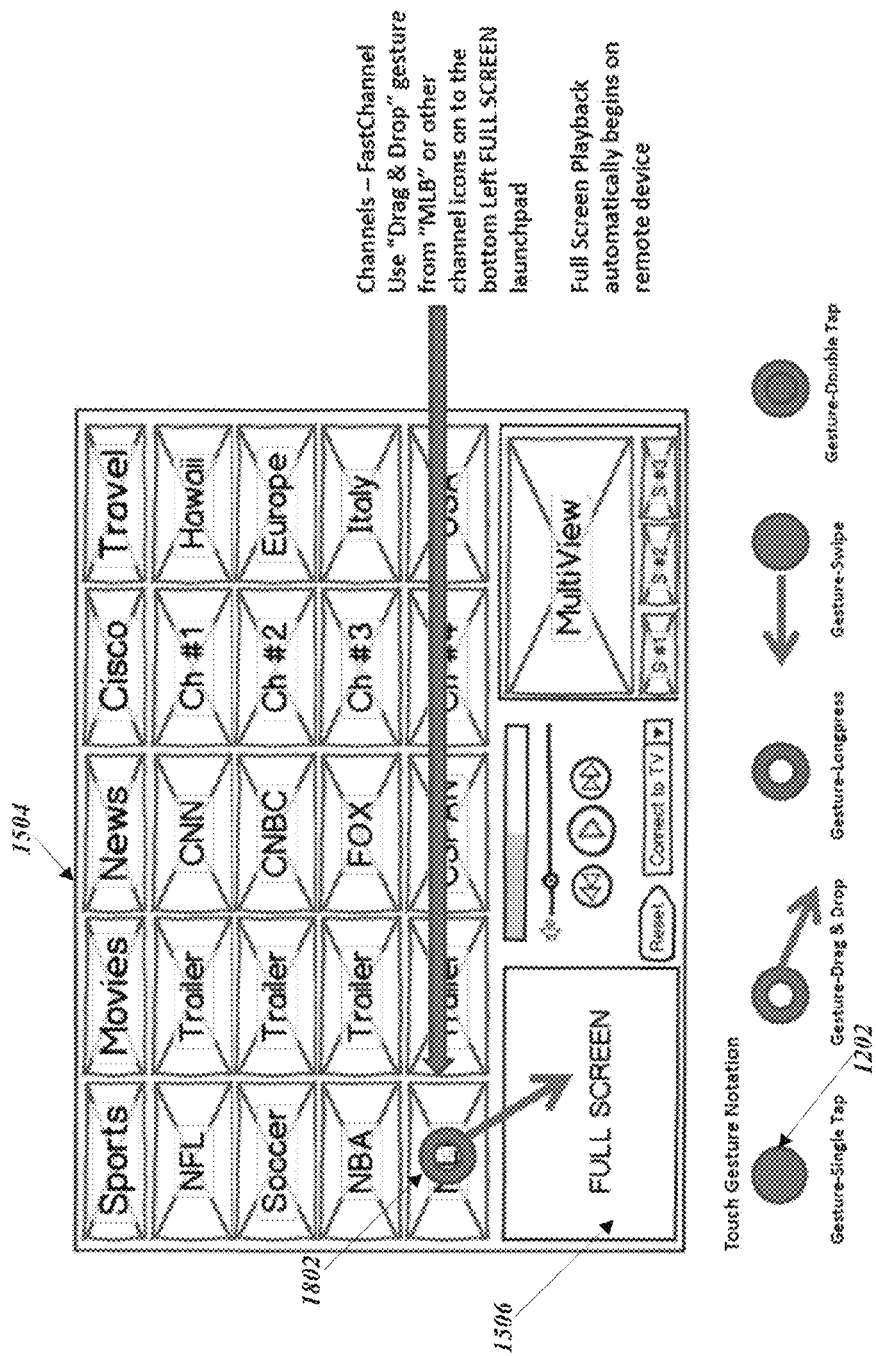
FIG. 18 depicts another user interaction with a user interface.

FIG. 18 shows a configuration in which the user is able to drag and drop a channel icon 1802 into the full screen portion 1506. As a result, the selected channel will be displayed on a remote device in the full screen mode.

Figure 19:
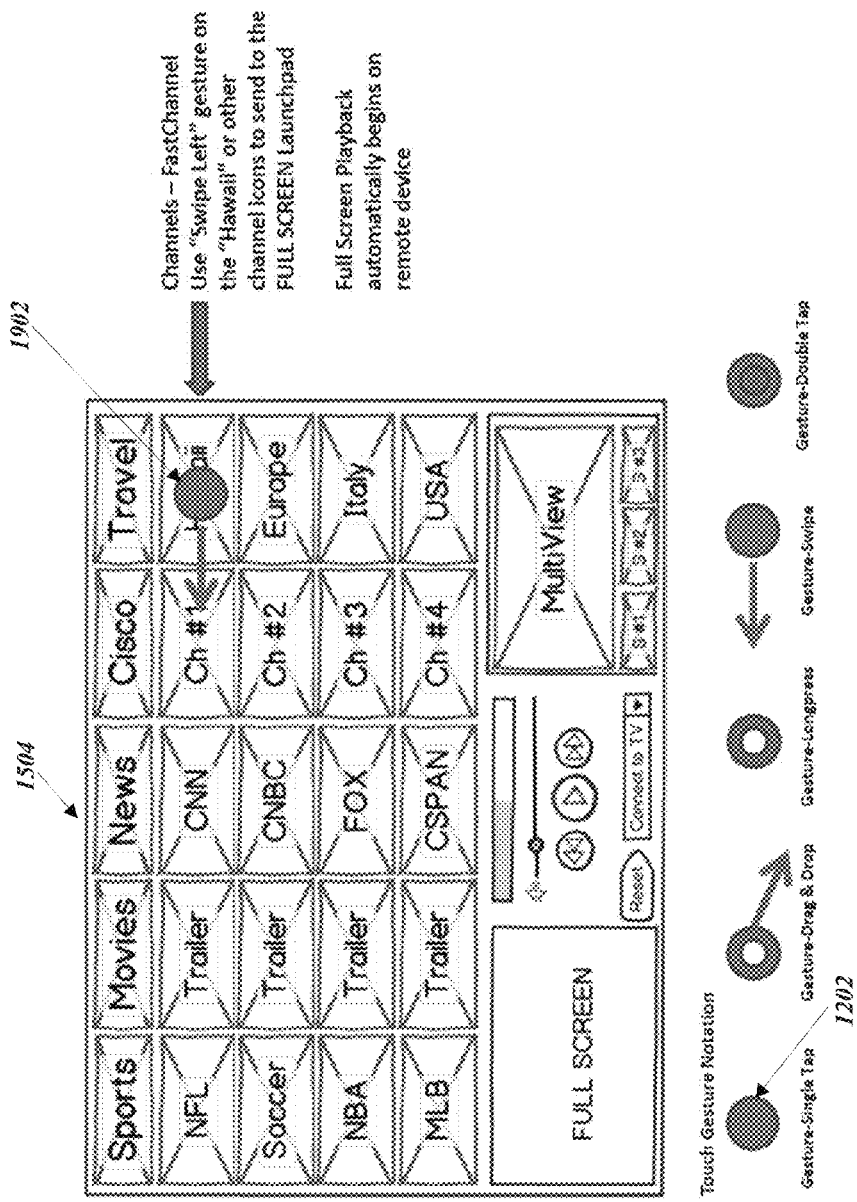
FIG. 19 depicts another user interaction with a user interface.

FIG. 19 shows another embodiment in which a user is able to use a gesture such as left wipe to swipe a channel icon 1902 to the left. Since there is another channel icon to the left, generally, this type of action may not mean anything. However, to facilitate fast channel changes, in some embodiments, this swipe may be mapped to one of the display options, e.g., full screen display to a remote device. The operation of a full screen display on a remote device is discussed previously in this document.

Figure 20:
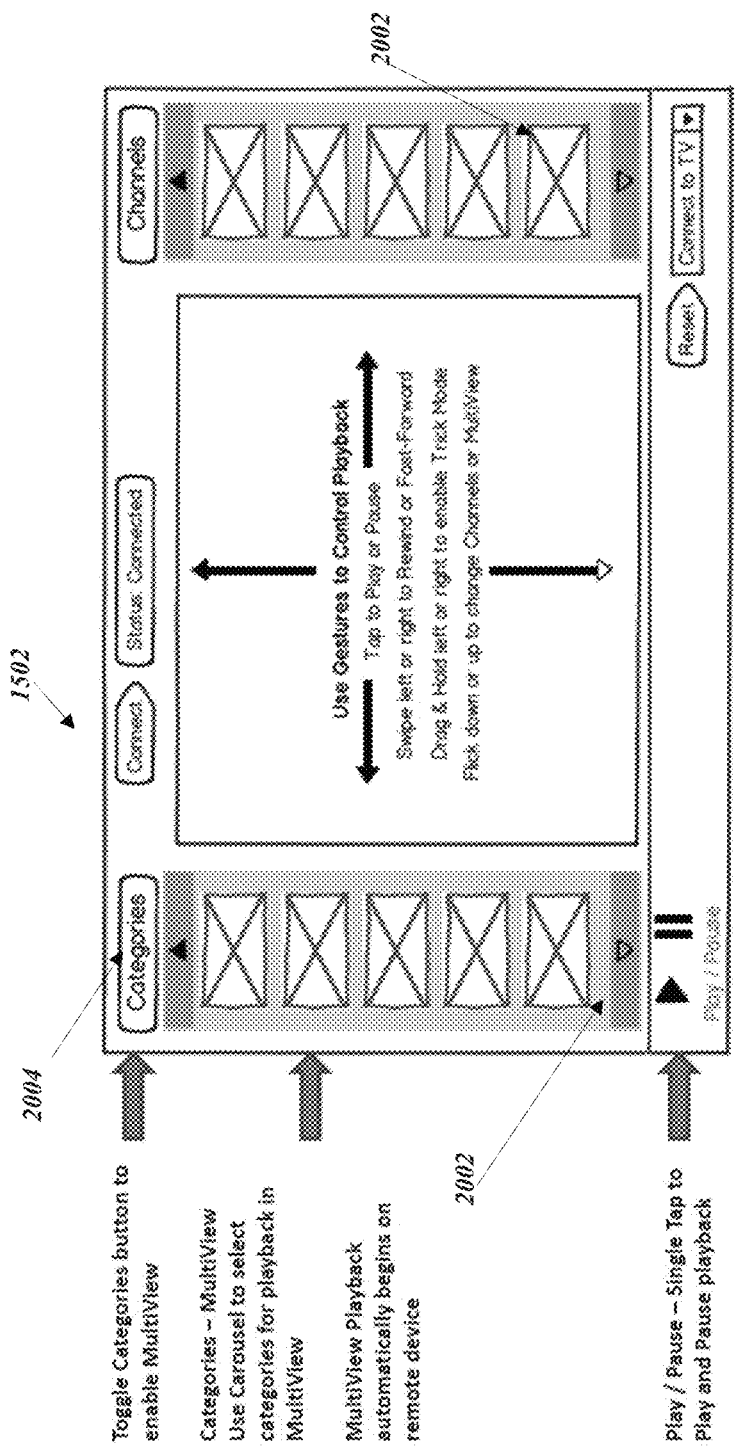
FIG. 20 depicts multiple user interactions with a touch sensitive user interface.

FIG. 20 depicts another embodiment of a user interface in which categories and channel menus are made available as a scrollable carousel of menu strip 2002. In some embodiments, the menu strips may be horizontally positioned also. In a carousel scheme, depending on user finger swipe, entries may enter in or leave from the visible area of the screen. The categories button 2004 may be tappable such that double tapping may reveal a next category. Similarly, the "channels" button can also be double-tapped on to go from one channel to the next. In some implementations, the carousel "loops back," that is, when a video window goes out of the display limits due to a swipe or scroll by the user, then the same video window loops back and comes back into the display limit from the opposite side. For example, if the menu strip includes videos ABCDEFGH in a carousel fashion, with the video windows for BCD currently in display area, then a finger swipe to the right changes the sequence to HABCDEFG, with the video windows ABC now in the display area, and a second finger swipe to the right changes the sequence to GHABCDEF, with video windows HAB in the display area, and so on. In some implementations, a similar functionality is built into a vertically scrollable menu strip, such that a video window that gets dropped from the bottom due to scrolling will appear from the top when the carousel loops back.

Figure 21:
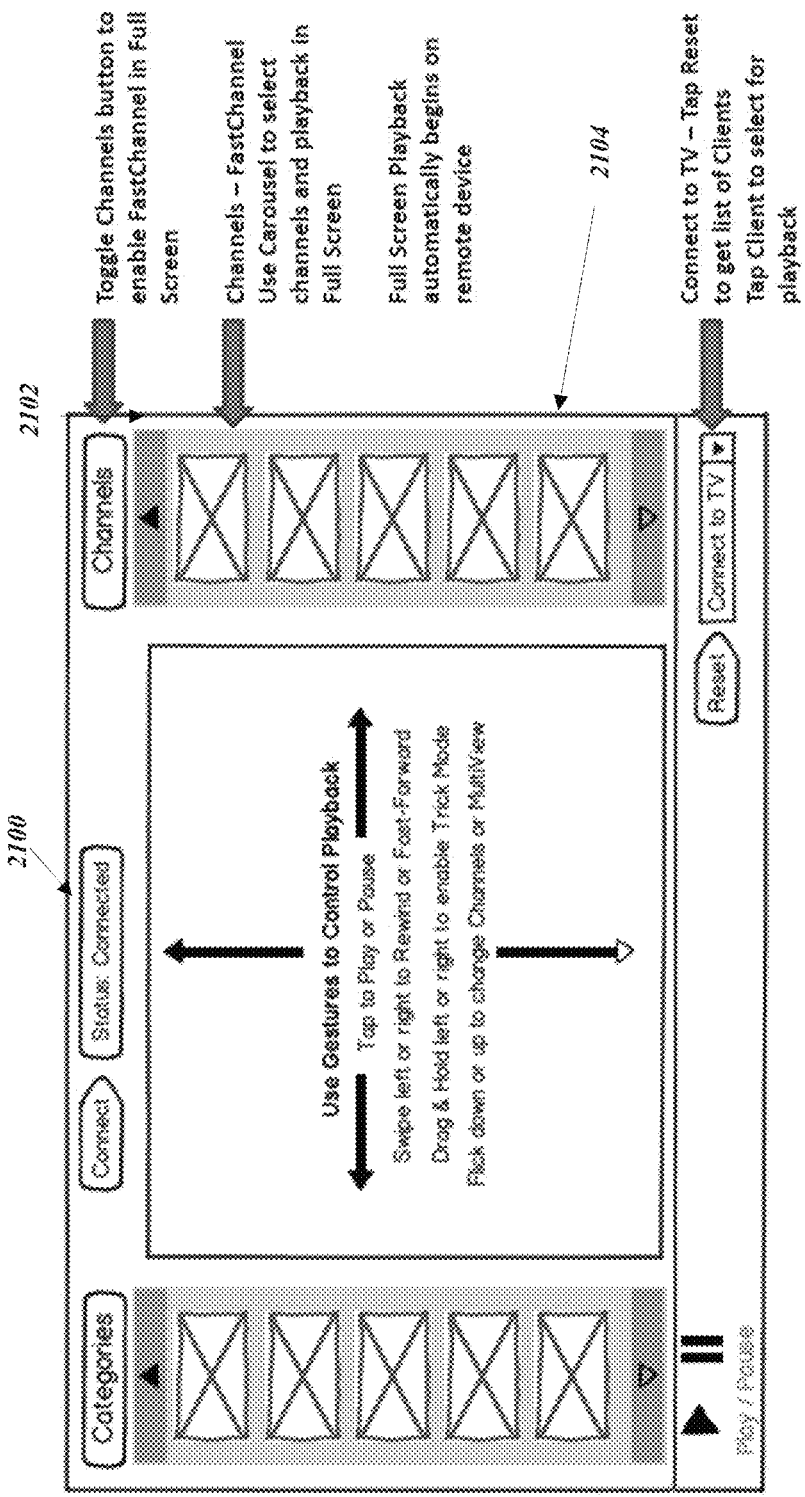
FIG. 21 depicts multiple user interactions with a touch sensitive user interface.

FIG. 21 depicts another arrangement of a user interface 2100. As depicted, the channels button 2102 can be toggled to enable fast channel change to full screen mode. The list of channels 2104 can be carousel based, as previously discussed, and can be browsed by the user to select a particular channel to watch. The use may select the channel to watch by double tapping on the corresponding icon or by swiping the icon to left, as previously discussed.

Figure 22:
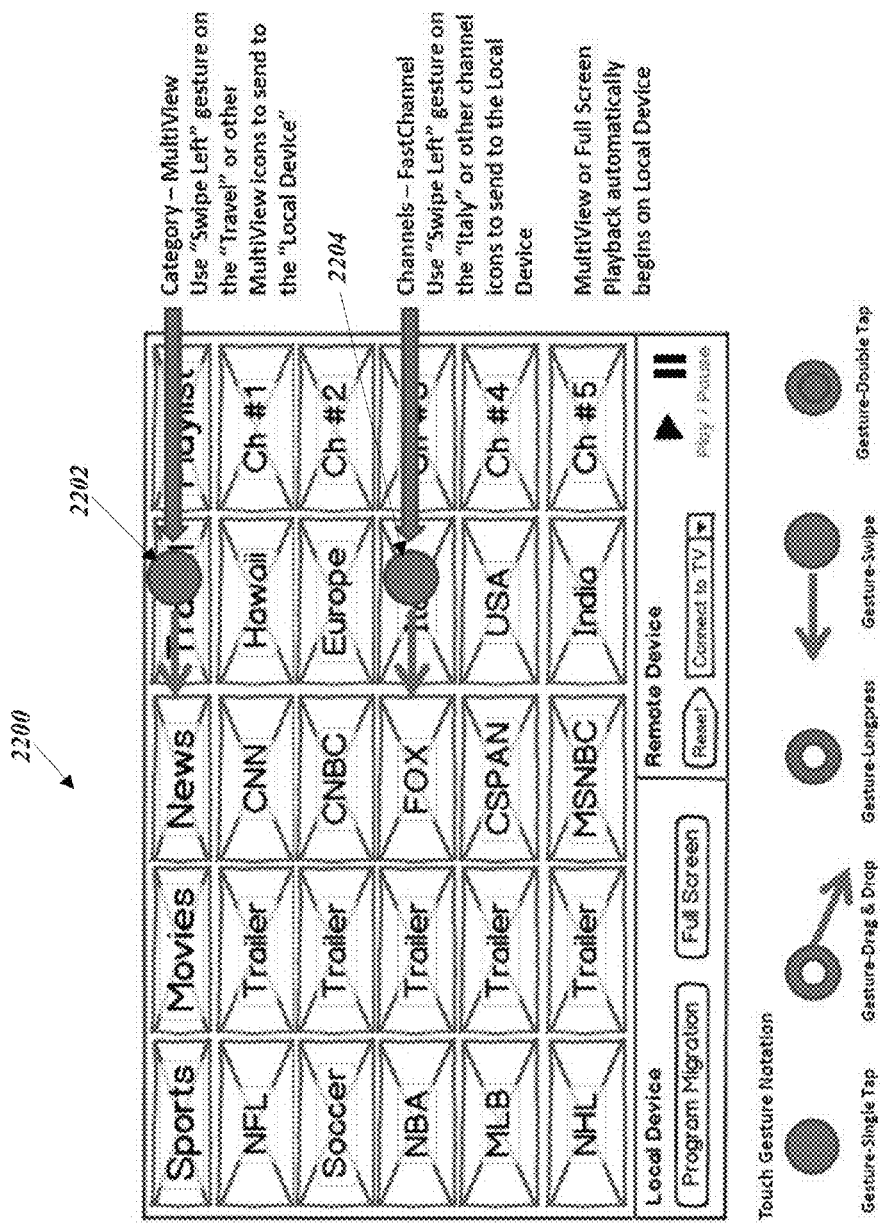
FIG. 22 depicts another user interaction with a user interface.

FIG. 22 depicts an example user interface arrangement 2200 in which a swipe left gesture is achieved to send the genre being selected ("travel") 2202 to a local device. When a genre is selected and sent to a local device, the local device may begin to display the video programs available within the genre in a multiview screen arrangement of primary and secondary display windows, as previously discussed. When a user performs a left-swipe operation on a program 2204, the swiped program may be sent to the local device, and the local device may begin a full screen (or primary display window) display of the swiped program 2204.

Figure 23:
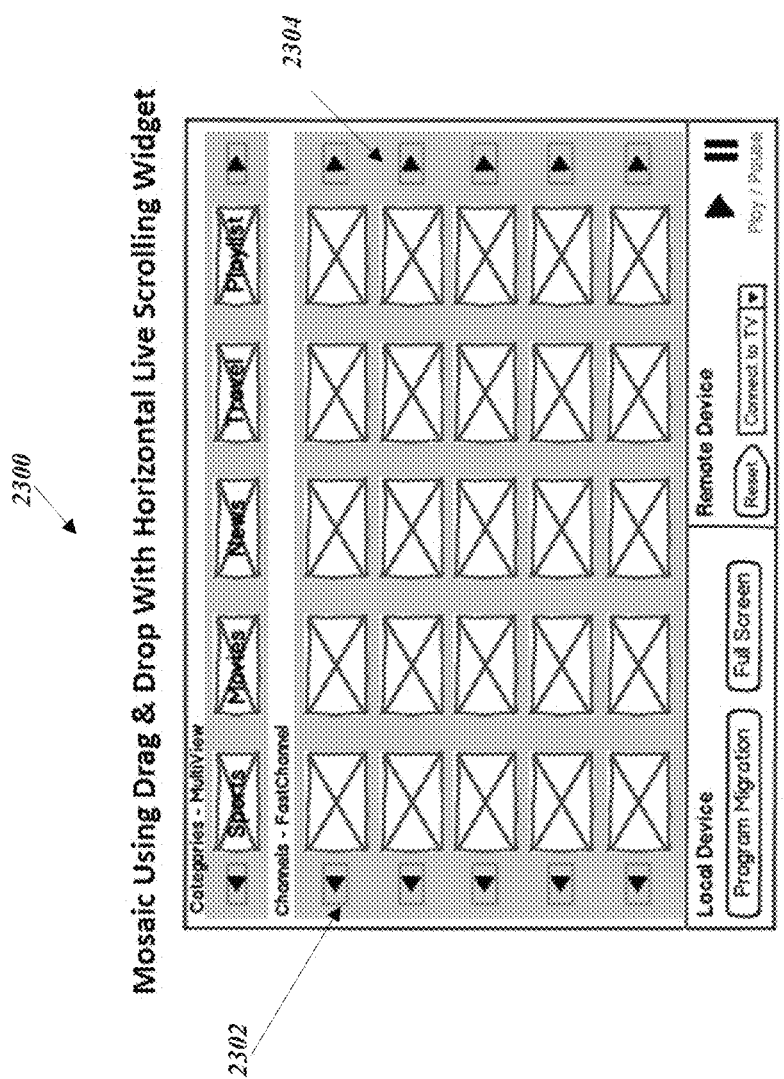
FIG. 23 depicts a user interface.

FIG. 23 illustrates the user interface 2300 to highlight the mosaicing aspect of the user interface arrangement 2300. As displayed by left arrow column 2302 and right arrow column 2304, in some user interfaces 2300, a user may be provided with the ability to finger scroll individual video programs within all genres in a "live" fashion. In other words, live video may be displayed within each video secondary window before, during and after the scrolling. Scrolling of the genre headbar may cause all programs listed under the genre to scroll simultaneously.

Figure 24:
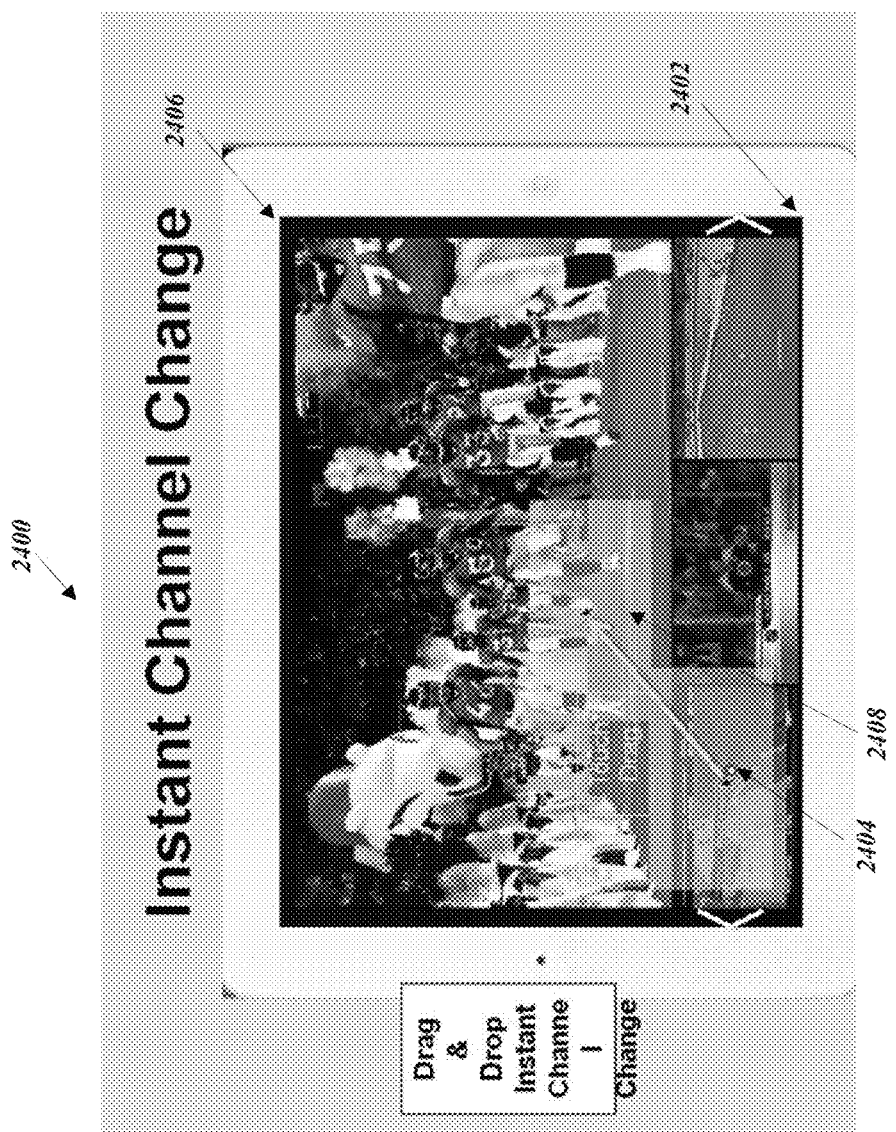
FIG. 24 depicts an instant channel change operation.

FIG. 24 illustrates the operation of instant channel change. The display screen of a portable device 2400 (e.g., a tablet, a smartphone, etc.) includes a main video portion 2406 in which a main video program is being played back. The main program is optionally associated with an audio output. The menu list 2402 is presented at the bottom and is scrollable using user finger swipes, as previously described. To change a channel, e.g., to view video program being displayed in one of the menu screens 2404, a user can simply touch the display window 2404 and drag and drop it into the main window 2406. In some embodiments, to provide a visual cue to the user, when the user touches the menu screen 2404, a visually distinct shape (e.g., a semi-transparent rectangle) 2408 is laid over the main picture so that the user can drag and drop the video 2404 to achieve a channel change.

Figure 25:
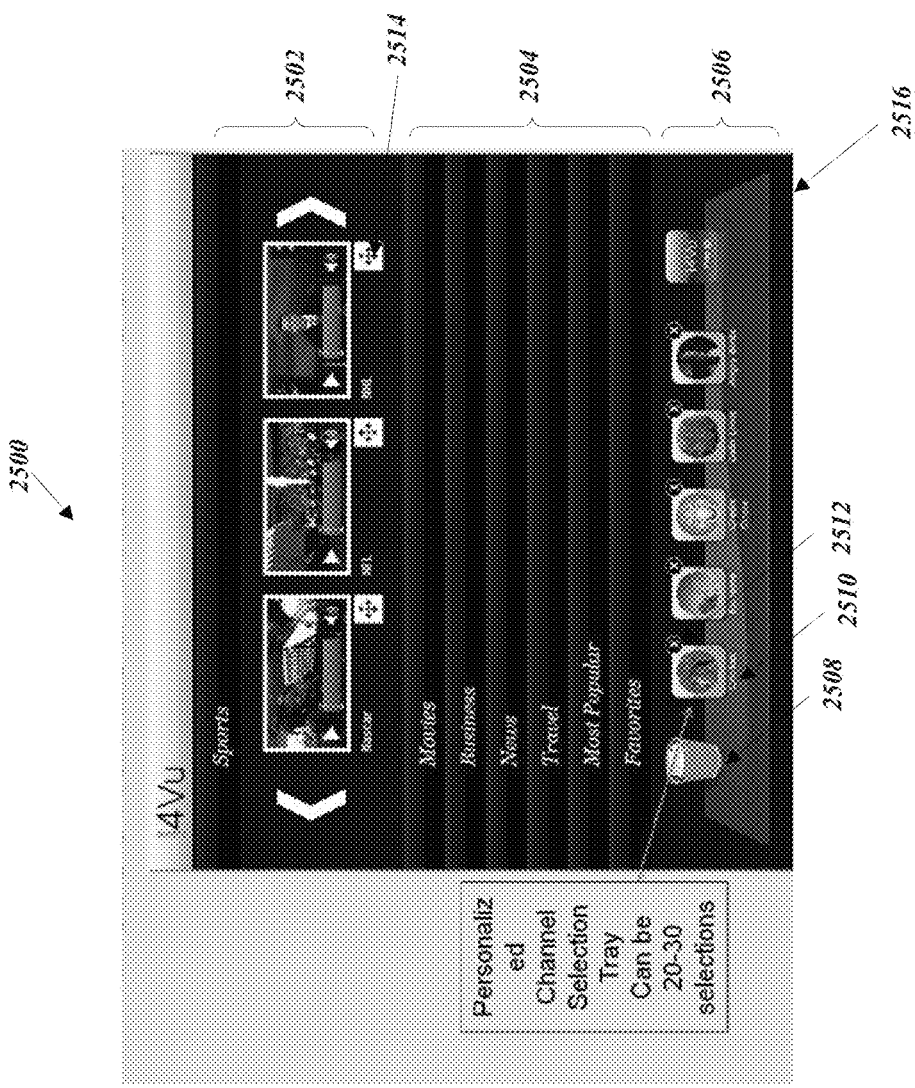
FIG. 25 illustrates a graphical user interface arrangement suitable for a touch-driven user interface.

In some implementations, the GUI arrangement 2500 illustrated in FIG. 25 may be presented to the user for browsing through available programs and selecting programs to watch. As discussed below, the arrangement 2500 may be suitable to, but not limited to, a touch-driven display system. The GUI arrangement 2500 includes at least some of the following user interface features:

A scrollable menu bar (preview strip) 2502 of channels available to a viewer. During a user's interaction, each of the window in the menu bar displays an available video to the user. Audio might be muted on all but one of the video being displayed. As menu bar 2502 is scrollable to both ends (left and right) using finger swipes, or mouse control, as discussed previously.

Visual indicators 2514, associated with programs being displayed in the menu bar 2502. Each visual indicators 2514 notifies the user that the video window can be shuffled around in the sequence of display across the preview strip 2502.

An accordion menu 2504, showing various video categories available. When a user selected a given category (e.g., sports is selected in FIG. 25), the corresponding available video programs become visible.

A personalized channel selection tray 2516. A user can drag and drop video channels, e.g., from the preview strip 2502, into the tray 2506 for the viewing. In some embodiments, the video programs 2510 in the tray 2516 may be represented by static icons. In some embodiments, the video programs 2506 added to the tray may be represented by moving pictures within the icon. In some embodiments, after a user selects and adds a video to the tray 2516, the client device may issue a notification to the server. Upon receiving the notification, the server may start streaming the video program to the client using bandwidth appropriate for small size display of the video. The video programs in the tray may be considered a "customized" channel list for the user.

A waste basket icon 2508: A user may be able to remove a video program previously added to the playlist 2506 of tray 2516 by dragging and dropping the icon into the waste basket. In some embodiments, when the user drops a video program into the waste basket 2508, the client device may issue a video termination message to the server. Upon receiving the video termination message, the server may stop transmitting the corresponding video data to the client device. Note that a user may also be able to remove the video program 2510 from the playlist 2506 by simply selecting (tapping or double tapping) the "X" menu 2512 on the video window 2510.

Figure 26:
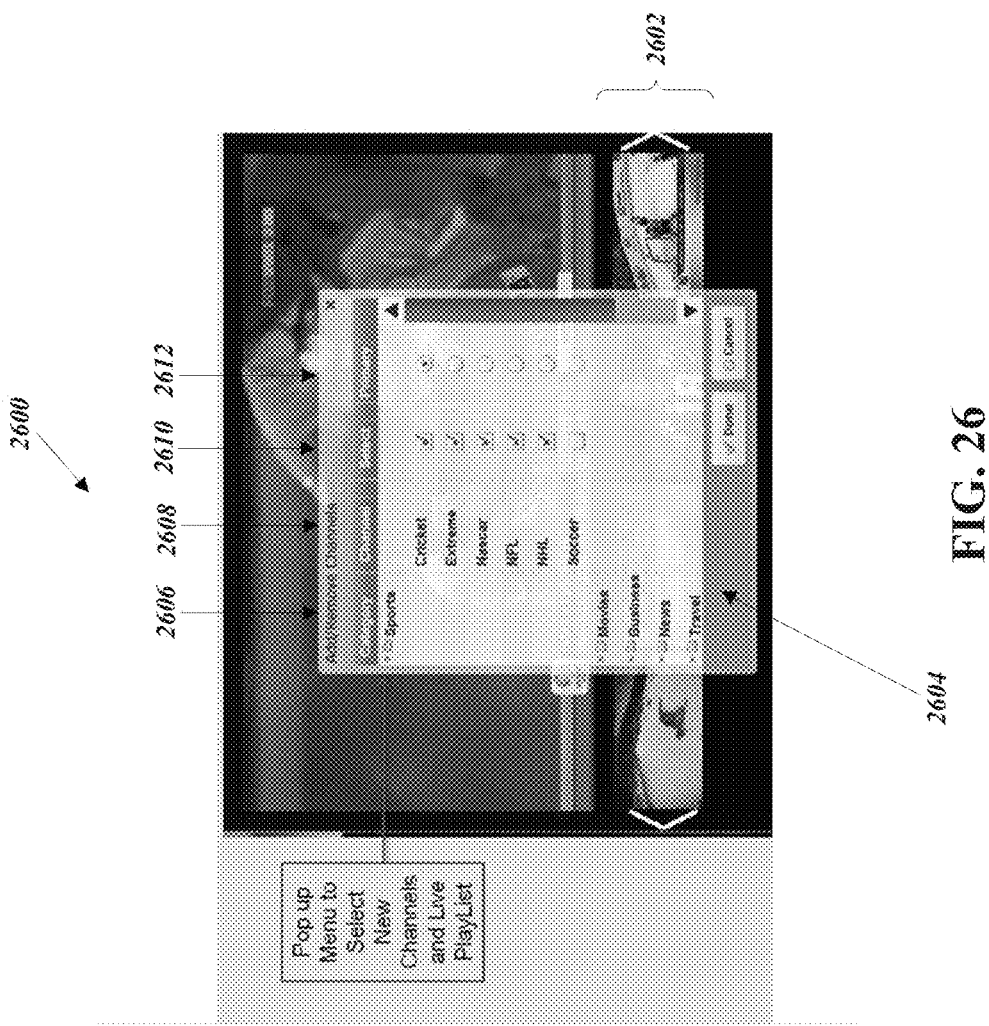
FIG. 26 illustrates a graphical user interface arrangement suitable for a mouse-driven user interface.

FIG. 26 illustrates a GUI arrangement 2600. The GUI arrangement may be convenient, but not limited to, a mouse-driven user interaction. During operation, a main video is displayed to the user in display window 2612. A preview strip 2602 of video is also displayed to the user, as previously described. When the user interacts with the display window 2612, a secondary menu window 2604 pops us. The secondary menu window as one or more of the following GUI features: GUI area 2606 that lists available video categories that are organized as collapsible lists. A channel list 2608 showing available channels for the selected category ("sports" in the illustrated example of FIG. 26). A selection menu area 2610 next to the channel list, enabling selection of videos by a user for adding to the strip 2602. A menu area 2612 in which the selected primary channel, corresponding to the video being displayed in display window 2612, etc. When the user selects the videos to display on the strip 2602 or the primary channel, a corresponding notification is transmitted from the client device to the server. Upon receiving the notification, the server adjusts transmission bitrates and transmits the corresponding selected programs to the client device.

Figure 27:
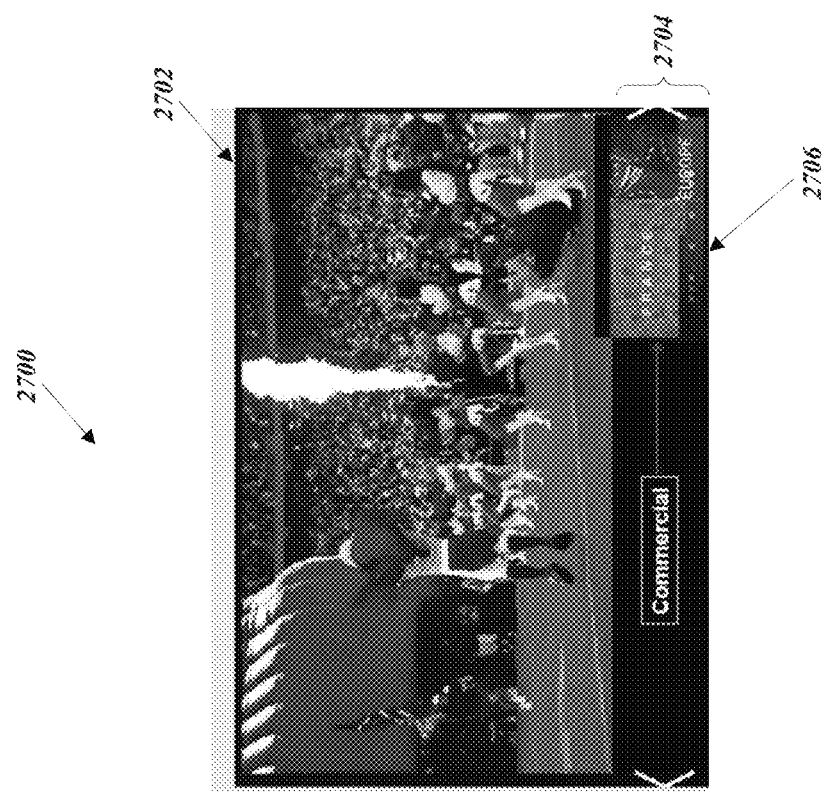
FIG. 27 illustrates a technique for inserting advertisements within a multi-program user interface.

FIG. 27 illustrates an example GUI arrangement 2700 for displaying advertisements to a user. The user selected primary video is displayed in the primary window 2702. An advertisement video 2706 (or graphical objects in general such as scrolling text and images) may be added to the preview strip 2704 which shows user-selected secondary videos. The duration, genre and placement of video may be controlled by the server by instructing the client device using control messages or by sending corresponding manifest files.

It will be appreciated that various user interface arrangements, client-server interactions and user control techniques are described for facilitating multi-program video viewing on a client device. In one aspect, a program guide is displayed in the form of a user interface arrangement in which various available videos are organized by genre (sports, live video, news, etc.). Each available video program can be displayed in a secondary window (secondary implying smaller display size than a primary window) and may have an associated caption, and control menus (e.g., "x" delete, cursor move visual indicator, etc.) The program guide may be mapped to a user interface arrangement comprising a genre based listing. In some implementations, moving video pictures at full frame rate may be displayed for video programs listed on the display for a selected genre. In some implementations, a user may be able to create a custom program list by selecting and dropping secondary video program display windows into an area of the user interface called a tray. The programs in the tray may be scrollable using finger swipes.

In another aspect, techniques (methods, apparatus and computer program products) for fast channel change are disclosed. A user may be able to achieve a fast channel change by touching a secondary video window and swiping it towards the primary video display window. In one implementation, the user may be able to tap, pick up the secondary window and drag and drop it into the primary display window. Optionally, in some implementations, when a user initiates such as action, the client device may display a visible cue suggestive of which area within the primary window the user should drop the secondary video into to achieve a channel change.

It will further be appreciated that the custom video list in the tray or videos displayed in a scrollable listing within a genre can be shuffled by the user to achieve a custom sequencing of the programs. The user may be able to perform the shuffling by simply touching a secondary window, causing the window to "stick" to the user's finger, and dragging and dropping the secondary window at an appropriate place within the listing.

It will further be appreciated that, in some implementations, the above-described operations may also be performed in the primary video display window.

It will further be appreciated that, in certain disclosed embodiments, a multi-program user guide may be presented to the user as a user interface arrangement displayed in a pop-up window. The previously described viewing, scrolling and shuffling capabilities can be made available within the pop-up window display. In some implementations, the pop-up may be designed to be suitable for a mouse-driven computer interface.

8. Client Server Architecture for Fast Channel Change

Figure 28:
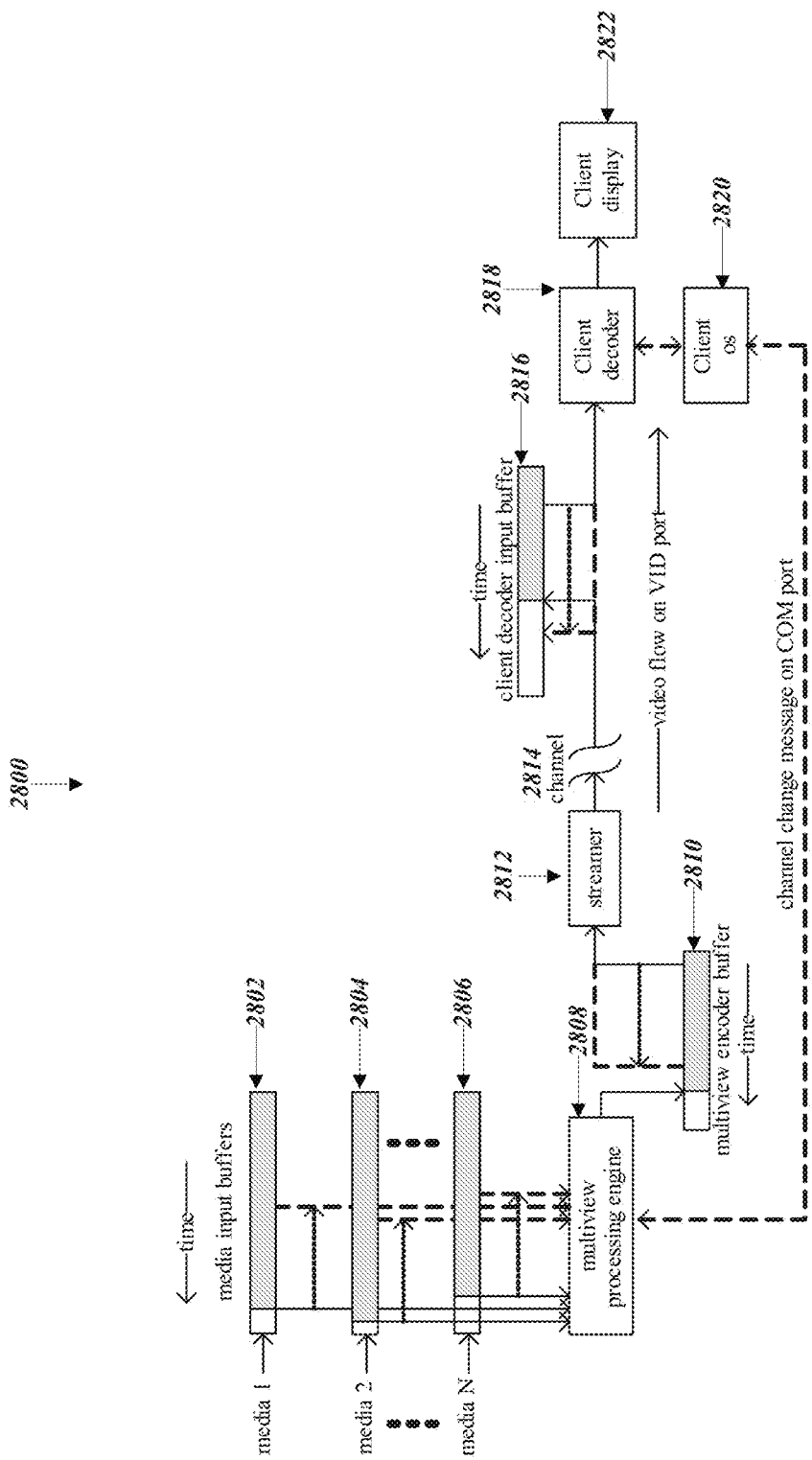
FIG. 28 is a block diagram representation of a client-server architecture for channel changes.

FIG. 28 shows a system architecture 2800 in which disclosed fast channel change techniques can be implemented. Multiple media programs 1 to N are input to a set of buffers 2802, 2804, 2806. A processing engine 2808 generates a single encoded stream using the multiview encoder buffer 2810. The encoded stream is streamed by a streamer 2812 over a channel 2814 to a client device. The client device may receive the packets transferred over the channel 2814 and store them in the decoder input buffer 2816 for further processing.

Under control of the client device, data bytes may be transferred from the buffer 2816 to the channel decoder 2818. The channel decoder 2818 may decode the data and present the decoded audio/video to a channel display 2822. The channel decoder 2818 may also be coupled to the multiview processing engine 2808 via a communication path that may carry messages such as a channel change message.

These buffers include the following buffers:

A media input buffer containing the input compressed media flow. There is one buffer per input media flow (2802, 2804, 2806)

Multiview encoder output buffer 2810 containing the compressed output from the multiview encoder (processing engine 2808).

Client decoder input buffer 2816 containing the multiview compressed bitstream to be decoded by the client decoder 2818.

The media input buffer 2802, 2804, 2806 is used to store a fixed length in time of input media flow. The multiview processing engine 2808 reads from the head of this buffer while previously processed bits are stored for a given length of time.

The multiview processing engine 2808 stores the encoded bits in the multiview encoder buffer 2810. This is typically the smallest buffer of the three.

The client decoder input buffer stores the compressed media flow to the client from which the client decoder receives bits which are decoded and displayed by the decoder.

In a single view setup the user switches from a currently viewed channel x to a new channel y.

In multiview setup the user switches from a set of channels X={x1, x2, x3 . . . } to a newset of channels Y={ y1, y2, y3, . . . }. Here we will assume that the first channel of the list is the primary channel with the largest resolution and associated audio. Hence, in channel set X the primary channel is x1 (underlined) and in set Y the primary channel is y1 (underlined).

9. Client Procedure for Fast Channel Change

Figure 29:
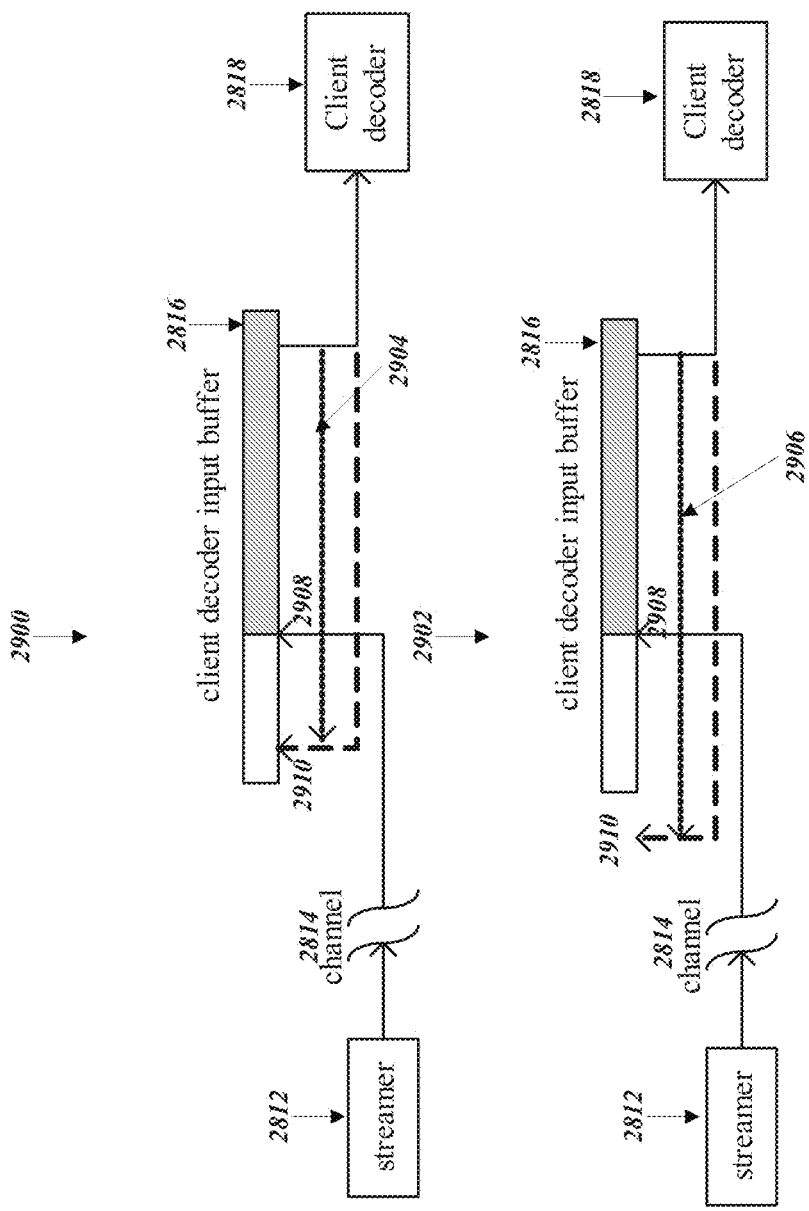
FIG. 29 shows example buffer management during the operation of a video viewing session.

FIG. 29 shows the read pointer 2910 movement of the client decoder buffer 2816 at the channel change point. Figure shows two separate cases 2900, 2902:

Read pointer 2910 advances to a point 2904 within the buffer 2816 but beyond the current fill level 2908 of the client decoder input buffer 2816.

Read pointer 2910 advances to a point 2906 outside the buffer client decoder input buffer 2816.

10. Bandwidth Management Algorithms

When a user is receiving video over a network, such as a wired or wireless Internet connection, the amount of bandwidth available to the video may change over time. The change could happen due to a variety of factors such as changing physical conditions on a channel, bandwidth lost to other users who are sharing the same transmission channel, level of congestion in intervening equipment such as routers and servers, and so on. Due to the changes in the amount of video data being delivered to the client device, the amount of data stored in the above-discussed buffers may change over time. The fullness of a buffer may impact the user experience. For example, if buffer fullness is below a certain amount (e.g., one video frame worth data), then no pictures may be available for a user to view, causing undesirable effects such as video freeze. Similarly, when buffer fullness is too high, there may not be space to hold currently incoming video data, which then may result in buffer overflow, causing dropped frames.

Techniques that control the buffer fullness therefore help, in one aspect, to provide high quality user experience in watching the delivered video. In some embodiments, the transmitting entity (streamer) can use a buffer fullness module per each client device to which a video stream is being delivered. The buffer fullness module uses the information about the amount of video data delivered and the delivery rate and an estimate of how much of the delivered data is being used by the client device (i.e., taken out of the client buffer) to calculate an estimate of buffer fullness. Alternatively, a client device may occasionally send messages to the streamer indicating a level of buffer fullness at the client device. A client device may also send messages to the streamer reporting available network bandwidth measurements performed at the client device.

In a typical streaming video viewing application, the rate at which video bits are removed from a decoder buffer is typically constant and known. The rate of video data removal from the decoder buffer, e.g., depends on the frame rate of display and the number of bits used in encoding in a frame. The rate at which video data is added into the decoder buffer may depend on the transmission rate and/or the encoding rate of the video. In other words, it may be possible to control the fullness of decoder buffer by controlling the transmission rate of video data. The transmission rate of video data at a given time cannot exceed the available network bandwidth. In the description below, while example techniques are disclosed in which the buffer fullness measure is used to control the instantaneous transmission rate of video, alternatively, similar discussion holds true for instantaneous measured network bandwidth also.

With reference to FIG. 30, one example implementation of a bandwidth management algorithm is described. For a given video program being received by a client device (and correspondingly being transmitted by the server), three buffers and corresponding rate tiers are managed at a client-side and/or at a server-side. The video bitrate at which the server transmits a give video program to a client device may be characterized by a "normal rate" or a "peak rate" and a "lowest rate." At any given instant in time, depending on the operational situation as described below, the instantaneous transmission rate may be between the peak rate and the lowest rate assigned to a particular video program.

Three additional bitrates may be defined such that $$\text{Peak Rate} > \text{Rate 3} > \text{Rate 2} > \text{Rate 1} > \text{Lowest rate} \qquad \text{Equation (1)}$$

In parallel with the above discussed multiple transmission rates, multiple divisions of a receiving buffer for the video program may be characterized by a Peak Buffer, a Lowest Buffer and three intermediate buffers B0, B1 and B2 such that $$\text{Peak Buffer} > \text{Buffer\_3} > \text{Buffer\_2} > \text{Buffer\_1} > \text{Lowest buffer} \qquad \text{Equation (2)}$$

At a client device, the client may monitor buffer fullness and periodically report the buffer fullness to the server.

At the server, a computational module may maintain an estimate of the buffer fullness at a client for one particular video being transmitted to the client. The server may adapt the bitrate of transmission of the video program to the client device as follows:

When the client buffer fullness is above Buffer_3 (e.g., 15 seconds worth of video content is in the client device's buffer), then the server may provide video at Peak Rate or at least a rate that is between the Peak Rate and Rate_3. This operational condition may occur at the operational point 3004.

At operational point 3006, the buffer fullness may be greater than Buffer_2 but less than Buffer_3 (i.e., fall within Rate Tier 2). In such as case, the server may transmit the digital video at Bitrate_2.

At operational point 3008, the buffer fullness may be greater than Buffer_1 but less than Buffer_2 (i.e., fall within Rate Tier 1). In such as case, the server may transmit the digital video at Bitrate_1.

At operational point 3010, the buffer fullness may fall below Buffer_1. In such a case, the server may recognize this as a condition of severe impairment in which a user's viewing experience may be compromised. The server may transmit video at the Lowest Rate for the video sequence.

Figure 31A:
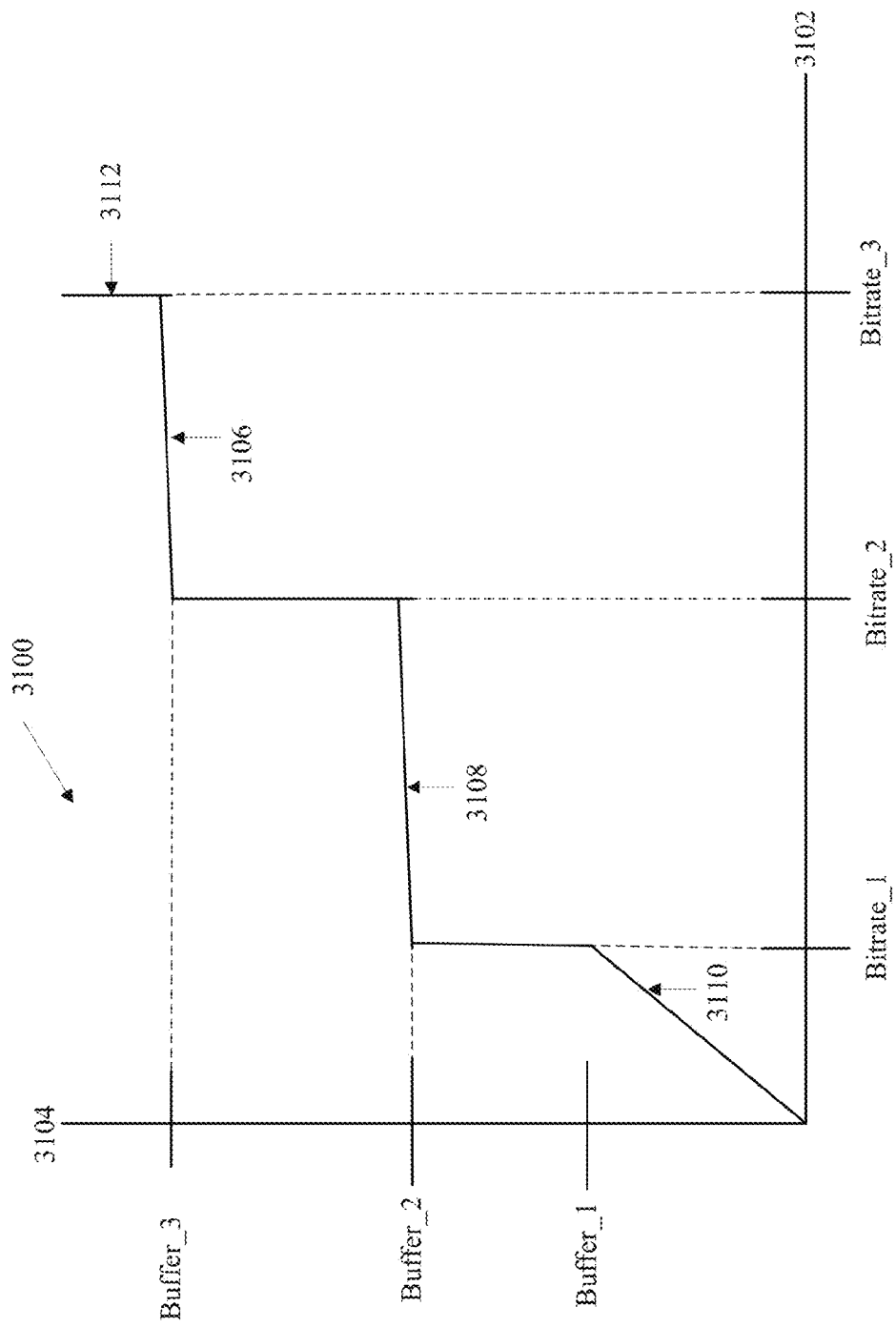
FIG. 31A is a graphical representation of bitrate allocation as a function of buffer fullness.

With reference to graph 3100 shown in FIG. 31A, another example bitrate allocation strategy is discussed with respect to the curve 3112. The horizontal axis 3102 represents the bitrate axis and the vertical axis 804 represents the buffer fullness. When the buffer fullness is Buffer_3 or above, server may transmit video at the Bitrate_3, which may correspond to the highest bitrate allocated to the transmission of that program.

When the buffer fullness begins to fall from just above Buffer_3 value to Buffer_3 and below, the server may correspondingly reduce the bitrate allocated for the delivery of the program, as represented by the portion 3106. In various implementations, the reduction of bitrate from Bitrate_3 to Bitrate_2, as represented by the portion 3106, may be instantaneous (i.e., portion 3106 is a horizontal line), or have a finite slope (i.e., bitrate is reduced in a continuous fashion from Bitrate_3 to Bitrate_2), or have a hysteresis loop (i.e., a memory may be built into the decision about reducing or increasing the bitrate between values Bitrate_2 and Bitrate_3).

The operation in the portion 3108 of the curve 3112, can be similar to the above-discussed operation in the portion 3106.

The operation in the portion 3110 of the curve, where the buffer fullness has fallen below the buffer level Buffer_1, which results in a possible impairment in the viewing experience, the bitrate may be reduced linearly with the reduction in buffer fullness, as depicted by portion 3110 which is a straight line with a constant slope.

Typical operational values may be as follows.

TABLE 2

| Buffer level | Equivalent playback time |
|---|---|
| Buffer_3 | 15 seconds |
| Buffer_2 | 10 seconds |
| Buffer_1 | 5 seconds |

In some embodiments, the server may include all bits (e.g., overhead of IP packetization) to estimate the buffer fullness at a client device.

For a typical high quality video program for display in a main window on a device such as an iPad or a 7 inch Android device (several models of which are currently available in the market), the bitrates used may be as follows:

TABLE 3

| Rate Tier | Bitrate used (kilobits per second) |
|---|---|
| Rate Tier 3 | 600 |
| Rate Tier 2 | 400 |
| Rate Tier 1 | 120 |

In some embodiments having greater than 3 rate tiers, the bitrate allocation may be: 600 Kbps, followed by 400, 200, 120, 100 kbps.

Figure 31B:
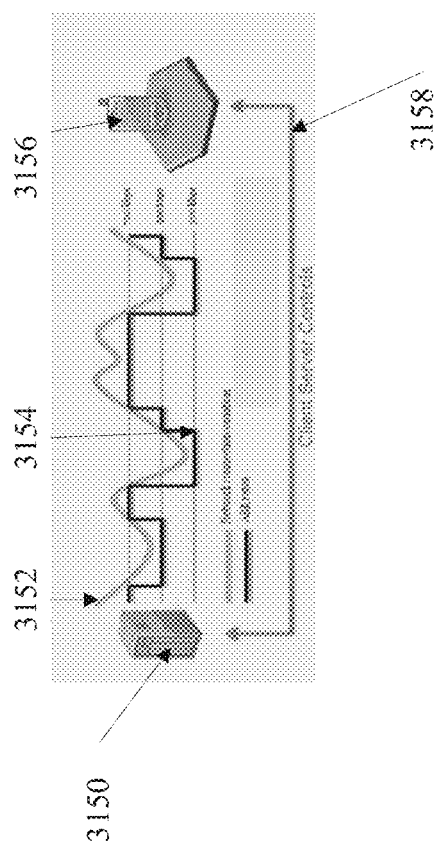
FIG. 31B is a graphical representation of adaptive bitrate as a function of network connection speed.

FIG. 31B is a graphical representation showing operation of a bandwidth-managed video delivery system. Video is delivered from a streamer 3150 to a client device 3156. A communication channel 3158 is available for communication of control messages between the streamer 3150 and the client device 3156. Time progresses horizontally from left to right. The curve 3152 depicts time-varying nature of network connection bandwidth. The network bandwidth can be measured by the streamer 3150 and/or by the client device 3156 and communicated back to the streamer 3150 on the channel 3158. In response to the network bandwidth determination, the streamer 3150 changes the streaming rate of transmission, as indicated by curve 3154. As a non-limiting example, the allocated bitrate in curve 3154 is seen to take one of the three values: 300, 500 and 700 kbps.

In some implementations, the following network bandwidth adaptive scheme of video delivery may be used. When the server starts a streaming session, i.e., begins transmission of a video program to a client device, the server may start streaming the video out at 1.3 megabits per second (Mbps). Periodically (e.g., about every 1 to 2 seconds), the streamer may determine available network bandwidth. In one implementation, video may be delivered over the network using transmission control protocol (TCP) and the available network bandwidth is determined based on how fast the streamer is able to write video data into the TCP stack. In some implementations, the TCP stack is modified to produce throughput numbers for how fast the TCP stack is able to send out packets over the network connection. In some implementations, when the instantaneous network bandwidth falls below the video transmission bitrate, then the video rate is dropped to 75% of the previous rate. In some implementations, when the instantaneous network bandwidth is greater than 150% of the current video rate being used, then the video rate for the next video segment is increased. Other relationships between available network bandwidth and instantaneous video rate are also possible.

Figures 32, 33:
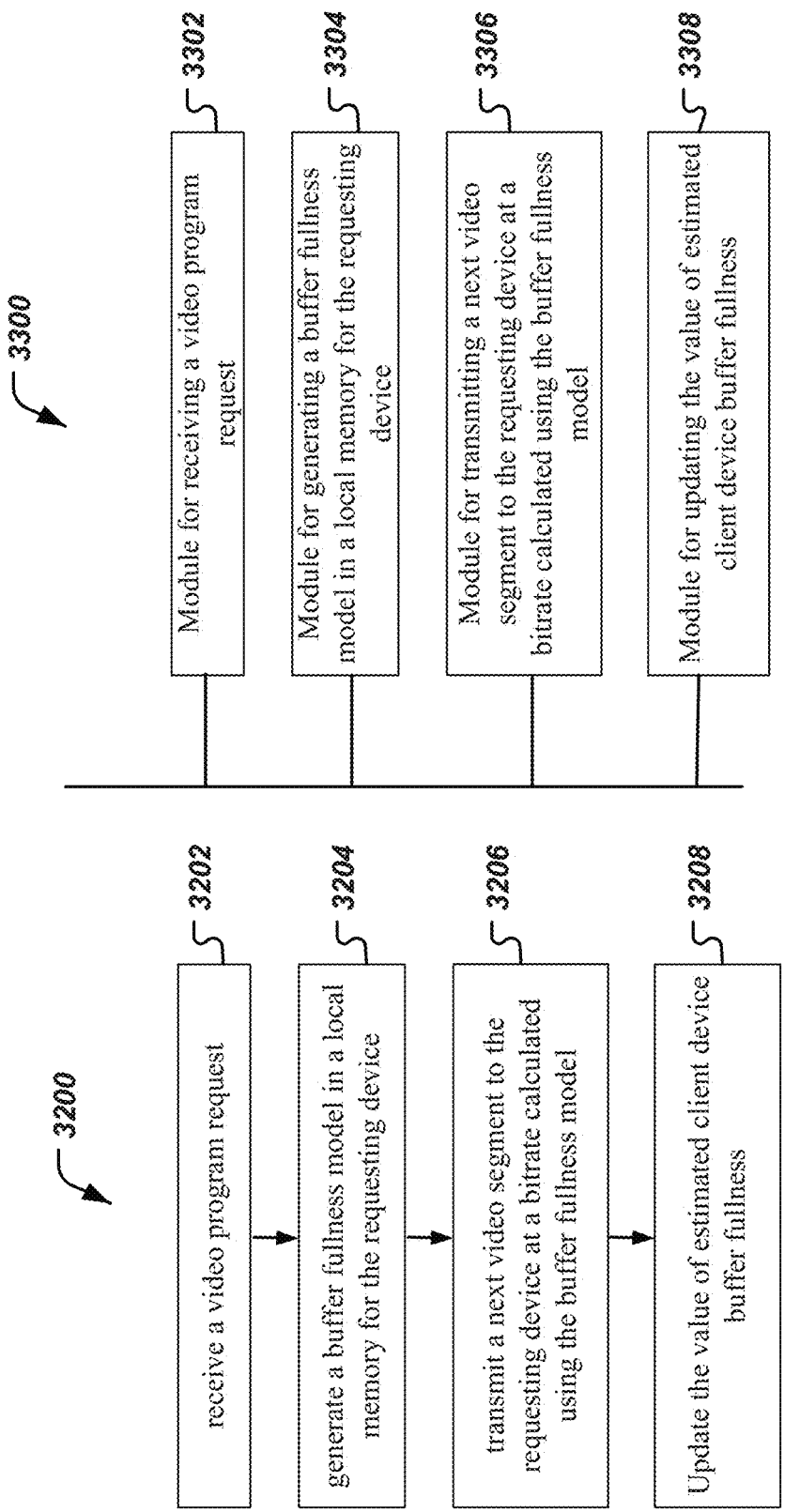
FIG. 32 is a flowchart representation of a process of controlling a transmission bitrate.
FIG. 33 is a block diagram representation for a video delivery apparatus.

With reference to FIG. 32, a flowchart 3200 of a process of bitrate allocation to a video stream being delivered to a client device is as follows. At 3202, a request for a video program is received. At 3204, a buffer fullness model for the requesting device is generated at a local memory. At 3206, based on a current value of the estimated client device buffer fullness, a next video segment is transmitted to the client device at a bitrate. At 3208, a current value of the estimated client device buffer fullness is updated In some embodiments, the updating may be based on time. In some embodiments, the updating is based on the amount video data transmitted in the most recent transmission. In some embodiments, the updating is based on a buffer fullness message received from the client device. At least one buffer threshold value is used such that when the estimated client device buffer fullness is above the buffer threshold value, then the video is transmitted using a higher bitrate than when the estimated client device buffer fullness is at or below the buffer threshold value.

FIG. 33 is a block diagram representation of a portion of an apparatus 3300 for delivering video at a video rate that is adaptive to a client device buffer fullness. The module 3302 is for receiving a video program request from a client device. The module 3304 is for generating a buffer fullness model for the requesting client device. The module 3306 is for transmitting a next video segment to the requesting client device at a bitrate calculated using the buffer fullness model. The module 3308 is for updating the value of estimated client device buffer fullness. In some embodiments, the updating may be based on time. In some embodiments, the updating is based on the amount video data transmitted in the most recent transmission. In some embodiments, the updating is based on a buffer fullness message received from the client device.

It will be appreciated that several techniques for adapting video delivery bitrate as a function of client device buffer fullness or available network bandwidth are disclosed. In some configurations, a client device buffer fullness model is constructed at a server. The model is updated by receiving buffer fullness messages from the client device or by estimating client device buffer fullness based on a local calculation of the amount of video data transmitted to the client and the passage of time.

It will be further appreciated that techniques are disclosed in which an estimated instantaneous network bandwidth is used by the streamer to adjust the streaming rate of the next transmitted video segment.

It will further be appreciated that several techniques implementable at a client-side are disclosed. In one disclosed aspect, a client device provides feedback to a server about the buffer fullness in the client device's video buffer. In another aspect, a client device providers feedback to a server about the instantaneous network bandwidth measured by the client device. The feedback message is periodically transmitted. In some implementation, the period of transmission is decided by the client device using criteria including one or more of, a random period, a fixed period, a period that changes frequency based on the buffer fullness (or network bandwidth), a period that is adjusted based on the rate of change of buffer fullness (or network bandwidth), upon receiving a request from the server, a perceived network condition and so on. In one exemplary embodiment, when the rate of change of buffer fullness is above a first threshold or below a second threshold, then the buffer feedback message is generated and transmitted more often.

A disclosed method of controlling a user interface for display and navigation of multiple video programs includes displaying a graphical user interface comprising a plurality of available video programs, allowing a user to generate a custom list of video programs by selecting at least one video program from the plurality of video programs, and simultaneously displaying the videos programs from the custom list while displaying the graphical user interface to the user. Additionally, a computer-readable medium storing instructions, when executed by a processor, causing the processor to implement the above-described process is disclosed.

The techniques described in this disclosure may be implemented within one or more of a general purpose microprocessor, digital signal processor (DSP), application specific integrated circuit (ASIC), field programmable gate array (FPGA), programmable logic device (PLD), or other equivalent logic devices. Accordingly, the terms "processor" or "controller," as used herein, may refer to any one or more of the foregoing structures or any other structure suitable for example of the techniques described herein.

The various components illustrated herein may be realized by any suitable combination of hardware, software, or firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-multimedia applications and devices. In some aspects, for example, such components may form part of a mobile device, such as a wireless communication device handset (e.g., a mobile telephone handset).

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Only a few examples and implementations are disclosed. Variations, modifications, and enhancements to the described examples and implementations and other implementations can be made based on what is disclosed.

The invention claimed is:

1. A method of controlling operation from a server concurrently providing a plurality of video programs to a client device, comprising:
    receiving, at the server, each of the plurality of video programs in a different video format;
    receiving, at the server, a first message from the client device indicating a first selection of a first of the plurality of video programs for display in a primary window and a second selection of a second of the plurality of video programs for display in a secondary window;
    processing, within the server and based upon the first message, each of the first and second of the plurality of video programs to generate an audio video output stream,
        each of the first and second of the plurality of video programs having the same video format in the audio video output stream,
        the first of the plurality of video programs being positioned for output within the primary window, and
        the second of the plurality of video programs being positioned for output within the secondary window;
    transmitting the audio video output stream to the client device;
    receiving a second message from the client device indicating a third selection of the second of the plurality of programs for display in the primary window; and
    processing, within the server and based upon the second message, each of the first and second of the plurality of video programs to generate the audio video output stream with the second of the plurality of video programs being positioned for output within the primary window and the first of the plurality of video programs being positioned for output within the secondary window.

2. The method of claim 1, further including:
    estimating, at the server and based upon an output rate of the audio video output stream from the server, an amount of the audio video output stream remaining in a playback buffer at the client device; and adjusting a video coding rate of the audio video output stream based upon the amount of the audio video output stream remaining in a playback buffer at the client device.

3. The method of claim 2, further including periodically repeating the step of estimating, at the server, an amount of the audio video output stream based on a value of estimated client device buffer fullness.

4. The method of claim 3, the value of estimated client device buffer fullness being based on time.

5. The method of claim 3, the value of estimated client device buffer fullness being based on an amount of data transmitted in the audio video output stream.

6. The method of claim 1, wherein the audio video output stream includes audio corresponding to only the one of the plurality of video programs positioned for output within the primary window.

7. The method of claim 1, wherein the audio video output stream includes subtitles corresponding to only the one of the plurality of video programs positioned for output within the primary window.

8. The method of claim 1, the step of transmitting comprising transmitting the audio video output stream using a transmission control protocol (TCP), the method further comprising:
monitoring throughput of the audio video output stream via TCP; and
decreasing a video coding rate of the audio video output stream in response to a decrease in the throughput.

9. The method of claim 8, the step of decreasing a video coding rate including decreasing the video coding rate of only one of the first and second of the plurality of video programs.

10. The method of claim 1, the step of transmitting comprising transmitting the audio video output stream using a transmission control protocol (TCP), the method further comprising:
monitoring throughput of the audio video output stream via TCP; and
increasing a video coding rate of the audio video output stream in response to an increase in the throughput.

11. The method of claim 10, the step of increasing a video coding rate including increasing the video coding rate of only one of the first and second of the plurality of video programs.

12. The method of claim 1, the audio video output stream containing a first output stream for the first of the plurality of video programs, and a second output stream for the second of the plurality of video programs.

13. A server apparatus, comprising:
at least one processor; and
a memory storing instructions, which, when executed by the processor, cause the processor to implement a method for controlling the server apparatus to concurrently provide a plurality of video programs to a client device, the instructions comprising:
instructions for receiving, at the server apparatus, each of the plurality of video programs in a different video format;
instructions for receiving, at the server apparatus, a first message from the client device indicating a first selection of a first of the plurality of video programs for display in a primary window and a second selection of a second of the plurality of video programs for display in a secondary window;
instructions for processing, within the server apparatus and based upon the first message, each of the first and second of the plurality of video programs to generate an audio video output stream,
the first and the second of the plurality of video programs having a single video format,
the first of the plurality of video programs being positioned for output within the primary window, and
the second of the plurality of video programs being positioned for output within the secondary window;
instructions for transmitting the audio video output stream to the client device;
instructions for receiving a second message from the client device indicating a third selection of the second of the plurality of video programs for display in the primary window; and
instructions for processing, within the server apparatus and based upon the second message, each of the first and second of the plurality of video programs to generate the audio video output stream with the second of the plurality of video programs being positioned for output within the primary window and the first of the plurality of video programs being positioned for output within the secondary window.

14. The server apparatus of claim 13, wherein the instructions further include instructions for:
estimating, at the server apparatus and based upon an output rate of the audio video output stream from the server apparatus, an amount of the audio video output stream first remaining in a playback buffer at the client device.

15. The server apparatus of claim 14, the instructions for estimating further including instructions for periodically estimating, at the server, an amount of the audio video output stream based on a value of estimated client device buffer fullness.

16. The server apparatus of claim 15, the value of estimated client device buffer fullness being based on time.

17. The server apparatus of claim 15, the value of estimated client device buffer fullness being based on an amount of data transmitted in the audio video output stream.

18. The server apparatus of claim 13, wherein the audio video output stream includes audio corresponding to only the one of the plurality of video programs positioned for output within the primary window.

19. The server apparatus of claim 13, wherein the audio video output stream includes subtitles corresponding to only the one of the plurality of video programs positioned for output within the primary window.

20. The server apparatus of claim 13, the instructions for transmitting comprising instructions for transmitting the audio video output stream using via a transmission control protocol (TCP), the instructions further including:
instructions for monitoring throughput of the audio video output stream via TCP; and
instructions for decreasing a video coding rate of the audio video output stream in response to a decrease in the throughput.

21. The server apparatus of claim 20, the instructions for decreasing a video coding rate including instructions for decreasing the video coding rate of only one of the first and second of the plurality of video programs.

22. The server apparatus of claim 13, the instructions for transmitting comprising instructions for transmitting the audio video output stream using a transmission control protocol (TCP), the instructions further including:

instructions for monitoring throughput of the audio video output stream via TCP; and instructions for increasing a video coding rate of the audio video output stream in response to an increase in the throughput.

23. The server apparatus of claim 22, the instructions for increasing a video coding rate including instructions for increasing the video coding rate of only one of the first and second of the plurality of video programs.

24. The server apparatus of claim 13, the audio video output stream containing a first output stream for the first of the plurality of video programs, and a second output stream for the second of the plurality of video programs.

* * * * *